United States Patent
Hagiwara

(10) Patent No.: US 10,157,366 B2
(45) Date of Patent: Dec. 18, 2018

(54) SYSTEM, APPLICATION AND METHOD FOR GENERATING PROPOSED STATE FLOORMAP

(71) Applicant: Kenji Hagiwara, Edgewater, NJ (US)

(72) Inventor: Kenji Hagiwara, Edgewater, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 341 days.

(21) Appl. No.: 15/081,114

(22) Filed: Mar. 25, 2016

(65) Prior Publication Data
US 2017/0278048 A1    Sep. 28, 2017

(51) Int. Cl.
  G06Q 10/08    (2012.01)
  H04L 12/24    (2006.01)

(52) U.S. Cl.
  CPC ........... *G06Q 10/087* (2013.01); *H04L 41/22* (2013.01)

(58) Field of Classification Search
  CPC ............................ G06Q 10/087; H04L 41/22
  See application file for complete search history.

(56) References Cited

U.S. PATENT DOCUMENTS

| | | |
|---|---|---|
| 9,007,631 B2 | 4/2015 | Hagiwara et al. |
| 9,130,838 B2 | 9/2015 | Anderson et al. |
| 9,398,413 B1 * | 7/2016 | Scalise ................ H04W 4/023 |
| 2006/0178917 A1 * | 8/2006 | Merriam .......... G06Q 10/06312 |
| | | 705/7.22 |
| 2014/0005809 A1 * | 1/2014 | Frei ..................... H04L 29/1249 |
| | | 700/90 |
| 2014/0068486 A1 * | 3/2014 | Sellers ................ G06F 3/04847 |
| | | 715/771 |
| 2014/0143695 A1 * | 5/2014 | Sundermeyer .......... H04L 41/22 |
| | | 715/765 |
| 2014/0222980 A1 | 8/2014 | Hagiwara et al. |
| 2014/0223512 A1 | 8/2014 | Hagiwara et al. |
| 2015/0193416 A1 | 7/2015 | Hagiwara et al. |
| 2015/0193469 A1 | 7/2015 | Hagiwara et al. |
| 2015/0213381 A1 | 7/2015 | Hagiwara |
| 2015/0220953 A1 | 8/2015 | Hagiwara et al. |

OTHER PUBLICATIONS

U.S. Appl. No. 15/058,370 of Kenji Hagiwara, filed on Mar. 2, 2016.
U.S. Appl. No. 15/062,521 of Kenji Hagiwara, filed on Mar. 7, 2016.
U.S. Appl. No. 15/064,433 of Kenji Hagiwara, filed on Mar. 8, 2016.
U.S. Appl. No. 15/071,089 of Kenji Hagiwara, filed on Mar. 15, 2016.
U.S. Appl. No. 15/077,806 of Kenji Hagiwara, filed on Mar. 22, 2016.

* cited by examiner

*Primary Examiner* — Daniel Samwel
(74) *Attorney, Agent, or Firm* — Cooper & Dunham LLP

(57) ABSTRACT

Systems, apparatuses, application software and methodologies are configured to assist a user to generate a proposed state (e.g., a proposed fleet of devices), for a customer. A user interface is provided through which the user can request a proposed state floormap graphically showing locations of devices in the proposed state to be presented. Thus, the object of arriving at a proposal for the customer can become a more manageable task.

18 Claims, 40 Drawing Sheets

Current State Analysis

Customer Information

Customer Name: Vespucci Systems

Main Address: 34 Silicon Street
Irvine, CA

Phone Number: (514) 909-9309

Email Address: contact@Vespucci.com

Industry: Multinational Corporation

Contact Person

Contact Name: Victor Macaroni

Office Address: Room 87
34 Silicon Street
Irvine, CA

Phone Number: (514) 909-3433

E-mail Address: macaroni@Vespucci.com

[Next] [Cancel]

New State Analysis

New State Analysis

Current State Analysis

Please Review the Following Information

Site A: Headquarters

Building 1: Main Office

Floor 1: Reception

Floor 2: Management

Building 2: Recreation

Floor 1: Ground

[ Cancel ]

[ Finished ]

Fig. 6H

New State Analysis

Current State Analysis

Import Device Information from Customer

Please upload the file containing information regarding the devices at each site (s)

Site A (Headquarters):

| VespucciDevices.xlsx | View | Import File |

Cancel

Next

Fig. 6J

Current State Analysis

VespucciDevices.xlsx

| ID | Model Name | Manufacturer | Type | Properties | Building | Floor |
|----|------------|--------------|---------|------------|--------------|------------|
| 1 | Matrix | Epson | MFP | View | Main Office | Management |
| 2 | Replicator | Lexmark | Printer | View | Recreation | Ground |
| 3 | Imagio | Ricoh | Printer | View | Main Office | Management |
| 4 | Artisan | ABC | | | | |

Fill in Blanks    Save As    Cancel

Next    Cancel

Fig. 6K

New State Analysis

VespucciDevices.xlsx

| ID | Model Name | Manufacturer | Type | Properties | Building | Floor |
|---|---|---|---|---|---|---|
| 1 | Matrix | Epson | Printer | View | Main Office | Management |
| 2 | Replicator | Lexmark | MFP | View | Recreation | Ground |
| 3 | Imagio | Ricoh | MFP | View | Main Office | Management |
| 4 | Artisan | ABC | Printer | View | | |

Fill in Blanks    Save As    Cancel

Next    Cancel

Fig. 6L

New State Analysis

Current State Analysis

Import Device Information from Customer

Please upload the file containing information regarding the devices at each site (s)

Site A (Headquarters):

| VespucciDevices(rev).xlsx | View |

Import File

[ Next ]          [ Cancel ]

Fig. 6M

Current v. Proposed

Proposed State Analysis

Generate Proposed State Analysis

*Devices*                *New Devices*

Matrix (modify)    [ Keep ]   [ Replace/Delete ]

Replicator (modify)   [ Keep ]   [ Replace/Delete ]

Imagio (modify)    [ Keep ]   [ Replace/Delete ]

Artisan (modify)    [ Keep ]   [ Replace/Delete ]

[ Add ]

[ Add ]

[ Add ]

[ Next ]

[ Cancel ]

Fig. 8B

Current v. Proposed

Proposed State Analysis

Generate Proposed State Analysis

*Old Device List*                                                                                    *New Device List*

Matrix (modify)         [ Keep ]    [ Replace/Delete ]      Envisio (modify)

Replicator (modify)     [ Keep ]    [ Replace/Delete ]      Mach I (modify)

Imagio (modify)         [ Keep ]    [ Replace/Delete ]      Imagio (modify)

Artisan (modify)        [ Keep ]    [ Replace/Delete ]      *Delete*

[ Add ]                             Vector (modify)

[ Add ]

[ Add ]

[ Next ]                [ Cancel ]

Fig. 8E

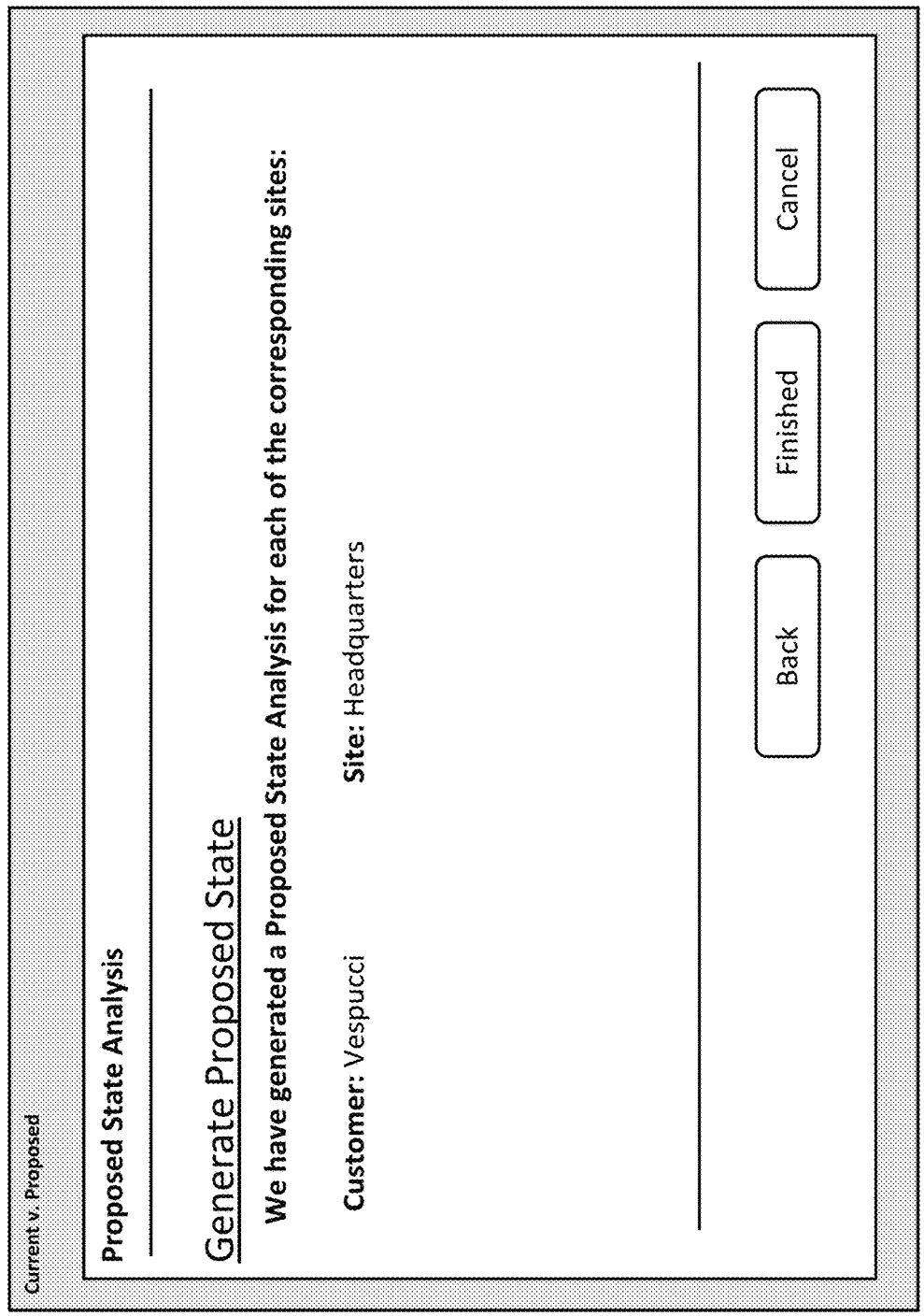

SYSTEM, APPLICATION AND METHOD FOR GENERATING PROPOSED STATE FLOORMAP

TECHNICAL FIELD

This disclosure relates to systems, apparatuses, application software, methodologies and other tools for generating a proposed state (e.g., a proposed fleet of devices), and more specifically, tools including provisions to generate a proposed state floormap graphically showing locations of devices in the proposed state.

BACKGROUND

In the current information age, information technology (IT) tools are extensively used in enterprises and other organizations in order to facilitate communication and processing of information, documents, data, etc. Indeed, it is now rare to find a workflow in an enterprise that does not employ IT tools. The number of IT assets [such as software, computers, printers, scanners, multi-function devices (MFDs), other network-connected or standalone devices] is generally increasing and, as a result, managing IT assets to meet enterprise needs is becoming a daunting task.

One approach for a vendor to make an educated and intriguing sales pitch to a customer or prospective customer is to present a proposal along with an analysis of the current IT expenditures of the customer or prospective customer. For example, a customer may wish to know, and a current state analysis may be prepared to show, total cost of ownership, or expected expenditures (such as for consumables) for devices [e.g., printers, scanners, facsimile devices, multi-function peripherals (MFP), etc.] for each period of one or more months, a year, 3 years, etc., output volumes, etc. Accordingly, the vendor typically attempts to determine the current IT assets of the customer or prospective customer and then collate information such as, but not limited to, acquisition type (i.e. lease/purchase), acquisition cost, depreciation of product, service cost, and in the case of printing products/services, consumables (e.g., paper, ink, toner, etc.) usage or cost, output, etc. Further, the vendor may analyze the needs of the customer or prospective customer in order to be able to offer a package of products and/or services that is attractive to the customer or prospective customer.

However, there exists a need for an improved approach for generating and presenting a proposed state for consideration.

SUMMARY

Various tools (e.g., systems, apparatuses, methodologies, application software, computer program products, etc.) can be configured to include any combination of various aspects and features described herein, to facilitate generation of a proposed state (e.g., a proposed fleet of output devices) for an enterprise (or another organization) or an enterprise site. Such tool can be employed by sales or marketing personnel, as well as by a customer, in a case of new sale, as well as in the instance of contract renewal, to obtain a proposed state analysis of a proposed fleet for the customer. For example, tool can be configured to generate, in an automated (or semi-automated) fashion, a proposed state floormap graphically showing locations of devices in the proposed state.

In an aspect, a device management application can be configured to generate a proposed state analysis (for a proposed fleet of output devices), based on a current state analysis to which are registered (i) buildings and floors of an office facility, (ii) devices in a current fleet and (iii) locations of the devices in the office facility. Such device management application includes an application user interface (UI) to permit a user to specify and modify a proposed state. The application user interface can also provide a current state floormap, on request and based on the current state analysis, and the current state floormap may be generated based on floormap data (e.g., a floormap image of a floor in the office facility, and optionally, device icons to be superposed at respective positions on the floormap image) registered in, or in association with, the current state analysis.

The device management application additionally includes a proposed state floormap generation module to generate a proposed state floormap (to be displayed by the application user interface), for a specified proposed state. The proposed state floormap may be generated, for example, by determining device changes as between the proposed state and the current state analysis (e.g., by comparing the proposed state and the current state analysis), and modifying a copy of the floormap data of the current state floormap as a starting point for the proposed state floormap, according to the device changes as determined.

In another aspect, the modification process may include determining a target device in the current fleet that is proposed in the proposed state to be replaced by a corresponding replacement device, and replacing a device icon of the target device with a device icon of the corresponding replacement device, at a corresponding position on the floormap image, indicated in the current state analysis in association with the target device.

In another aspect, the application user interface may permit the user to remove a selected device from the proposed state, and when modifying the proposed state floormap, the proposed state floormap generation module omits a device icon of the removed device from the proposed state floormap.

In another aspect, the application user interface may be configured to permit the user to make fleet changes to the proposed state, such as, for example, replace a selected device (or device model) in the proposed state with another device (or device model), modify a specified device in the proposed state, remove one or more selected devices, add new devices, etc., and the application user interface (UI) maintains a log of such fleet changes. In such example, the proposed state floormap generation module determines the device changes as between the proposed state and the current state analysis, by referring to the fleet change log.

In another aspect, the application user interface may permit the user to select a target device in the proposed state, and replace the selected target device with a replacement device, in the proposed state, and when modifying the proposed state floormap, the proposed state floormap generation module places a device icon of the replacement device in place of a device icon of the target device, at a corresponding position thereof on the floormap image.

In another aspect, the application user interface may permit the user to add a new device to the proposed state, and when generating the proposed state floormap, the proposed state floormap generation module leaves a device icon of the new device in an unplaced device portion of the proposed state floormap. The application user interface may permit the user to place the device icon at a location specified by the user on the proposed state floormap (or another floormap, specified by the user, e.g., corresponding to another floor amongst the floors of the office facility).

In another aspect, the application user interface may be configured to permit the user to move any device icon, selected from any floor amongst the floors of the office facility, to the unplaced device portion, and in response to such user operation, the proposed state floormap generation module updates, in the proposed state, location information of the moved device as unplaced.

In another aspect, the device management application may further comprise an automatic placement module that determines, after the proposed state floormap generation module generates a proposed state floormap for each floor amongst the floors of the office facility, whether any devices in the proposed state are unplaced. If there is an unplaced device that is not placed on any of the floors, the automatic placement module determines whether any floor amongst the floors of the office facility has a total monthly output in the proposed state that is lower than that in the current state analysis. If there are target floors for which the total monthly output in the proposed state is lower than that in the current state analysis, the automatic placement module places the unplaced device on one of the target floors.

In another aspect, when the automatic placement module determines the target floors for which the total monthly output in the proposed state is lower than that in the current state analysis, the automatic placement module determines for each of the target floors, a gap between the total monthly output in the proposed state and that in the current state analysis, and places the unplaced device on a target floor having a gap same as, or most similar to, a monthly volume of the unplaced device. Further, the automatic placement module may determine whether there are multiple unplaced items and whether the gap of any target floor amongst the target floors is the same as or greater than the sum of output volumes of the multiple unplaced devices, and if there are multiple unplaced items and the gap of the target floor is the same as or greater than the sum of output volumes of the multiple unplaced devices, the automatic placement module places the multiple unplaced items on the target floor.

BRIEF DESCRIPTION OF THE DRAWINGS

The aforementioned and other aspects, features and advantages can be more readily understood from the following detailed description with reference to the accompanying drawings wherein:

FIGS. 8A-8L show examples of user interface screens which can be provided on a terminal apparatus, according to an embodiment;

DETAILED DESCRIPTION

Figure 1A:
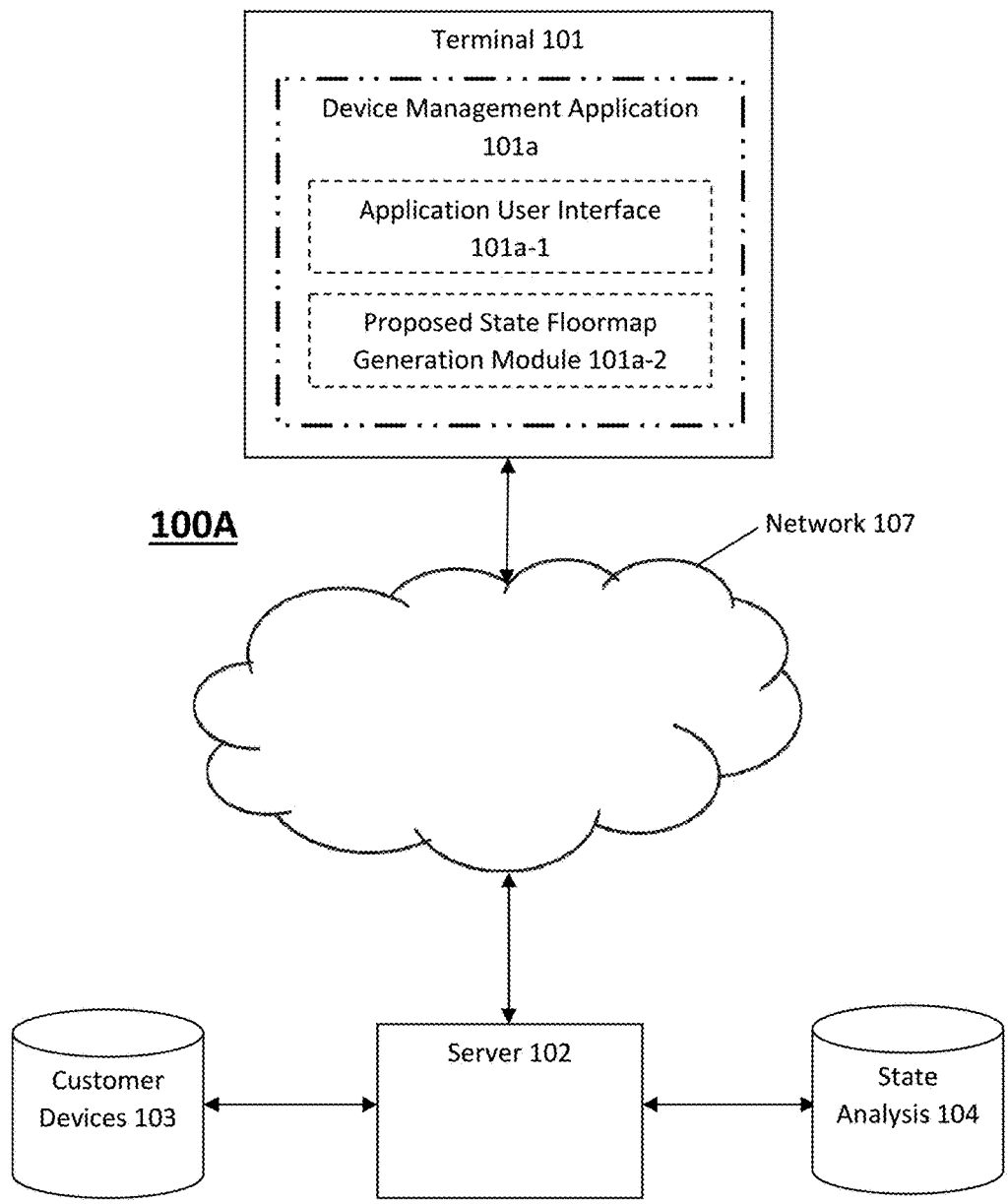
FIG. 1A shows a block diagram of a system within which a device management application can operate, according to an embodiment.

In describing embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Various tools to facilitate a proposed state analysis are discussed herein, with reference to a device management application. It should be appreciated by those skilled in the art that any one or more of such tools may be embedded in another application and/or in any of various other ways, and thus while various examples are discussed herein, the inventive aspects of this disclosure are not limited to such examples described herein.

FIG. 1A shows schematically a system 100A that includes a terminal 101 and a server 102 which are interconnected by network 107. Although only one terminal 101 is shown in FIG. 1A, it should be understood that the system 100A can include a plurality of terminal devices (which can have similar or different configurations).

The terminal 101 can be any computing device, including but not limited to a personal, notebook, tablet or workstation computer, a mobile phone or handset, another information terminal, etc., that can communicate with other devices through the network 107. The terminal 101 is further described infra with reference to FIG. 3.

The device management application 101a may be provided on or to the terminal 101 and provides an application interface thereon through which a user can generate a proposed state or request an analysis of a fleet of devices. Such application may be a native program installed on the terminal 101, or may be provided from an external source as an application and/or as part of a platform or service (e.g., software as a service, i.e. SaaS), or may be provided as a web page.

The device management application 101a is configured to perform analysis and calculations with regards to a set (or fleet) of one or more specified devices. Such analysis may be performed on an existing set of devices (e.g., a fleet of devices employed by a particular organization) or a proposed set of devices (e.g., a list of devices recommended to the organization for purchase, lease, etc.). Such analysis may be performed for the purpose of determining a set of devices that can meet the needs of a customer, in an optimal manner preferably.

When, for example, a new customer seeks a proposal for updating its fleet of output devices, a vendor would typically like to know what devices are currently employed by the customer in the customer's fleet. Such information may be sent to the vendor in various forms. For example, the customer may send a list of the devices constituting the current fleet to the vendor in an electronic format (e.g., spreadsheet, e-mail, etc.) or by paper (e.g., handwriting, typed, etc.). In another example, the customer may simply tell the vendor (e.g., meetings, telephone conference, etc.)

what devices the specific customer currently employs. After receiving information regarding the current devices from the specific customer, the vendor can utilize (that is, as a user of) the device and service management application 101a to create a current state analysis which includes the list of devices currently employed by the customer. It should be noted that the analysis may be performed for each device individually and/or the entirety of the devices at a site.

In the system shown in FIG. 1A, a device management application 101a is provided on or to a terminal 101, and includes an application user interface (UI) 101a-1 and a proposed state floormap generation module 101a-2.

The application user interface (UI) 101a-1, through which the user can generate a proposed state and/or request a proposed state analysis, presents, to the user of terminal 101, an interface in which the user can create and modify a proposed state. In many instances, a copy of the current state analysis data is employed as an initial starting point for a proposed state. For example, such a copy includes all of the devices that were in the selected current state analysis. Such copy includes (i) all of the devices that were in the selected current state analysis and (ii) floormap data designating the location of each of the devices in an associated floormap via icons. In an embodiment, the floormap data includes an image of a floormap (e.g., pdf, jpeg, png, GIF, etc.) in a building of an enterprise or enterprise site. In another embodiment, the devices in the copy of the current state analysis is superimposed on designated locations on the floormap image.

The proposed state floormap generation module 101a-2 obtains a copy of the floormap data from the current state floormap in order to generate a proposed state floormap. The proposed state floormap is not the complete as it is merely a starting point. The user may modify devices on the proposed state floormap via a variety of ways. For example, the user may (i) modify existing devices, (ii) delete existing device, (iii) add new devices, (iv) replace existing devices or (v) move devices from one floormap to another. In another embodiment, the user may be presented with a device list which includes all of the devices in the current state analysis that were copied over into the proposed state. When the user modifies the device list in anyway, such modifications are reflected on the floormap.

In an embodiment, if a user deletes a device from the device list, the device on the floormap is removed as well. In another embodiment, if a user replaces a target device in the device list with a replacement device, the target device on the floormap is automatically replaced with the replacement device which is disposed at the same position as the target device the replacement device replaced. In yet another embodiment, if a user adds a new device to the device list, the new device is not placed on a floormap until the user designates a position for the new device.

The server 102 may be used to access information regarding state analyses, customer device models, and contracts data which are stored in the customer devices database 103 and state analyses database 104. The user may access the server 102 to obtain data from any of the databases 103 (e.g., previously registered current/proposed state analyses) and 104 (e.g., information regarding customer devices) without having to manually input the information. The server 102 is further described infra with reference to FIG. 2.

The customer devices database 103 may include information regarding a fleet of devices (e.g., printer, MFP, scanner, facsimile machine, etc.) for each customer or customer site. Information regarding each of the devices in the fleet of devices, such as name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc.), device properties (e.g., manufacturer, model, serial number, etc.), etc. are stored in the customer devices database 103.

In an example, the customer device information in the customer devices database 103 may be captured in the form of an electronic spreadsheet. For example, the user may obtain from the customer information regarding the fleet of devices via an electronic spreadsheet with data (e.g., identifier, device type, functions, color technology, etc.) corresponding to each device. Such spreadsheet may be sent to the user electronically (e.g., e-mail), after which, the spreadsheet is stored in the customer devices database 103.

The state analysis database 104 registers any type of state analyses previously created by the user. In other words, the state analysis database 104 may include current state analyses corresponding to one or more customers and/or previously created proposed analyses. The database does not necessarily link a proposed state analysis to a particular customer, and a proposed state analysis may be created in future anticipation of a type of customer. For example, the company that the user works for may have a specific proposed state analysis which includes one or more recently created products (to be used together) that are designed for companies in the information technology (IT) industry. However, the company employing the user may not yet have any customers from the IT industry. As a result, there is no company linked with the specific proposed state analysis. When the device management application 101a receives instructions to create a proposed state analysis, the device management application 101a may request access to the state analysis database 104 from the server 102 for the purpose of obtaining an existing current/proposed state analysis.

The network 107 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 107. In addition, the network 107 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
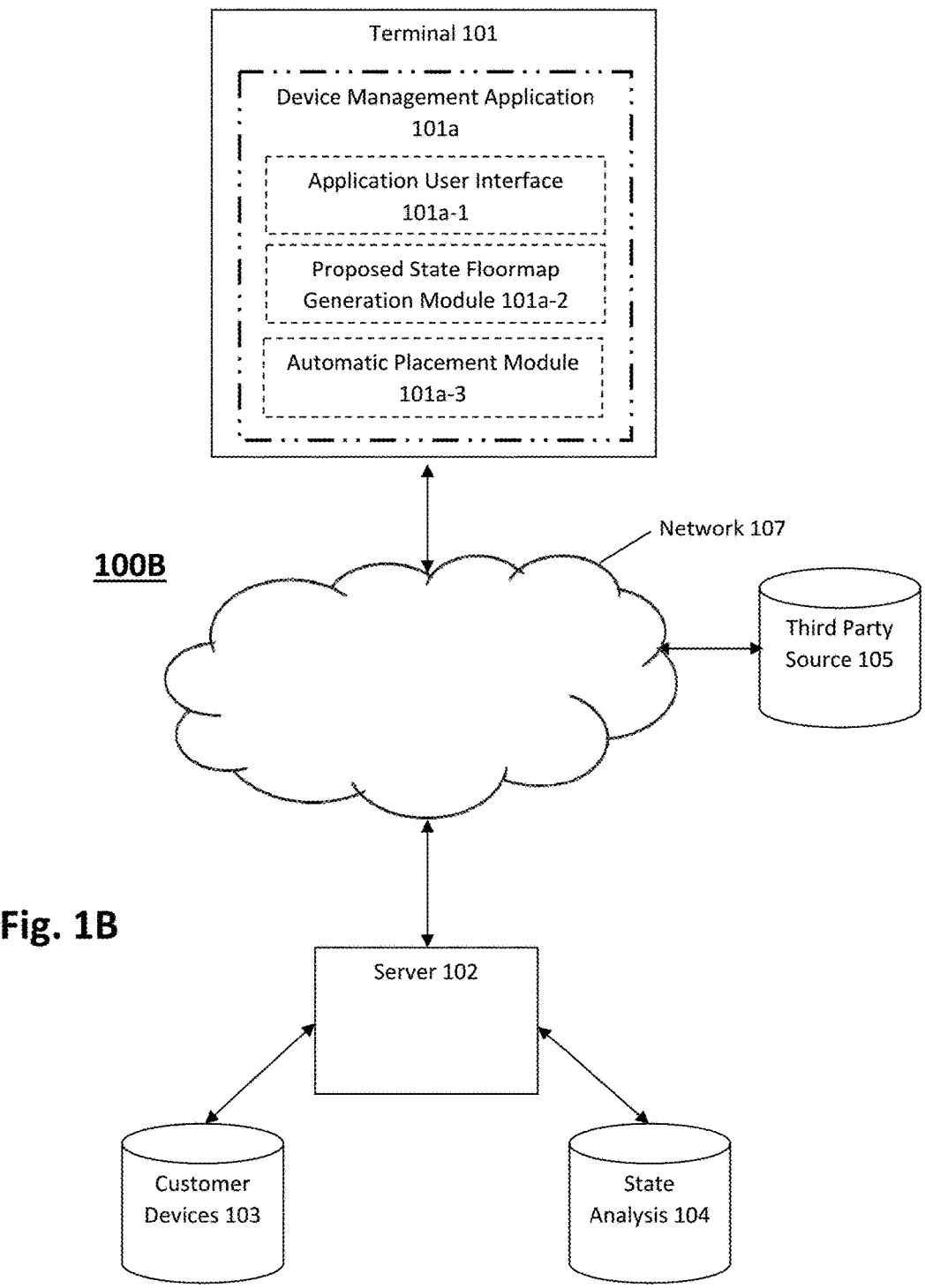
FIG. 1B shows a block diagram of a system within which a device management application can operate, according to another embodiment.

FIG. 1B shows schematically a system 100B, according to another embodiment. The system 100B is similar to the system 100A of FIG. 1A except that the system additionally includes an automatic placement module 101a-3 and third party source 105.

In an embodiment, after the proposed state floormap has been modified according to the revisions made in the device list by the user, the automatic placement module 101a-3 may check if any unplaced devices exist. In other words, the automatic placement module 101a-3 determines if there are any devices that have not yet been placed on any floormap corresponding to the proposed state. If there are unplaced devices the automatic placement module 101a-3 identifies one or more target floors having a total monthly output in a proposed state that is lower than in a current state analysis. In the case that there are target floors which have a total monthly output in a proposed state that is lower than in a current state analysis, the automatic placement module 101a-3 places the unplaced device into the target floor.

In an embodiment, when determining which of the target floors have a total monthly output in the proposed state is lower than that in the current state analysis, the automatic placement module 101a-3 also identifies whether there is a gap between the total monthly output in the proposed state and that in the current state analysis. In the case that there is a gap, the automatic placement module 101a-3 determines an unplaced device (if any) that has a gap that is the same as (or similar to) a monthly volume of the unplaced device.

In another embodiment, once the gap is determined, the automatic placement module 101a-3 determines additionally (i) whether there are more than one unplaced devices and (ii) whether the gap of any target floor is the same as (or greater than) the sum of output volumes of the two or more unplaced devices. In the case that this is true, the automatic placement module 101a-3 places the two or more unplaced devices onto the target floor.

The third party source database 105 may be databases maintained by any number of third party entities. Further, there may more than one third party source database connected to the network 107. For example, the third party source database may be maintained by an organization such as a device manufacturer, a commercial company or an online retailer. Each of the aforementioned organizations may register data regarding device models that are available on the market. In the case that the user of the terminal 101 attempts to determine the current state of the customer, such as by accessing a spreadsheet sent by the customer, the user may discover that the spreadsheet is missing certain information (e.g., price, functions, monthly volume, energy usage, etc.). The device and service management application 101a may automatically communicate with the third party source database 105 to obtain the missing device information and complete the spreadsheet.

Otherwise, operations of the elements of the system 100B are similar to those discussed in connection with the corresponding elements of the system 100A of FIG. 1A.

Figure 2:
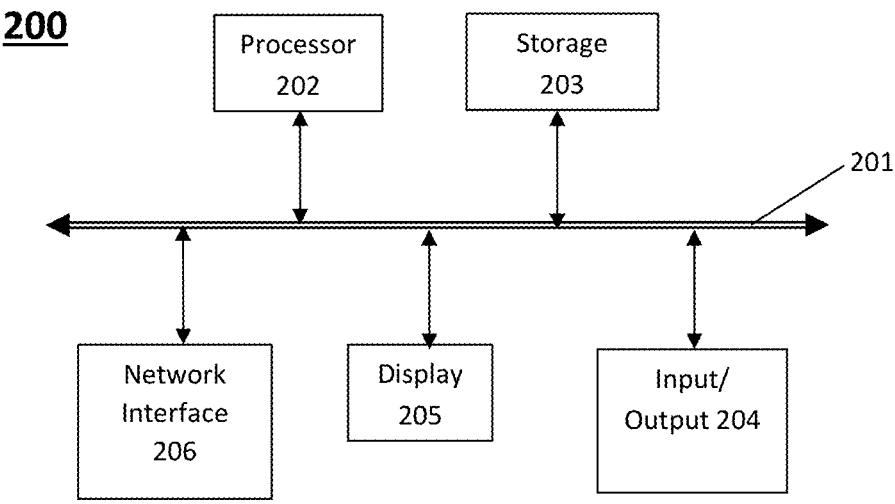
FIG. 2 shows a block diagram of an example of a configuration of a computing device that can be configured by software to operate as a server.

FIG. 2 shows an exemplary constitution of a computing device that can be configured (for example, through software) to operate (at least in part) as the terminal apparatus (e.g., 101 in FIGS. 1A and 1B) or a server (e.g., 102 in FIGS. 1A and 1B) or a host for database (e.g., 103 and 104 in FIGS. 1A and 1B; 105 in FIG. 1B).

In FIG. 2, apparatus 200 includes a processor (or central processing unit) 202 that communicates with a number of other components, including memory or storage device 203, other input/output (e.g., 10 keyboard, mouse, etc.) 204, display 205 and network interface 206, by way of a system bus 201. The apparatus 200 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. In the apparatus 200, the processor 202 executes program code instructions that control device operations. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with terminals through direct connections and/or through a network to which some components are not connected. As another example, the apparatus 200 does not need to be provided by a server that services terminals, but rather may communicate with the devices on a peer basis, or in another fashion.

The apparatus 200 of the present disclosure is not limited to a server or computer, but can be manifested in any of various devices that can be configured to communicate over a network and/or the Internet.

Figure 3:
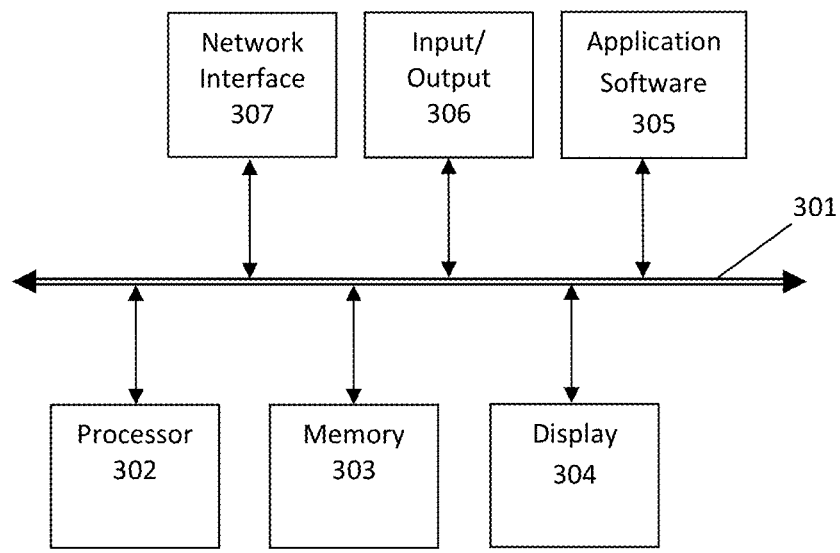
FIG. 3 shows a block diagram of an example of a configuration of a terminal or a terminal apparatus.

An exemplary constitution of the terminal 101 of FIGS. 1A and 1B is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 107 of FIGS. 1A and 1B).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
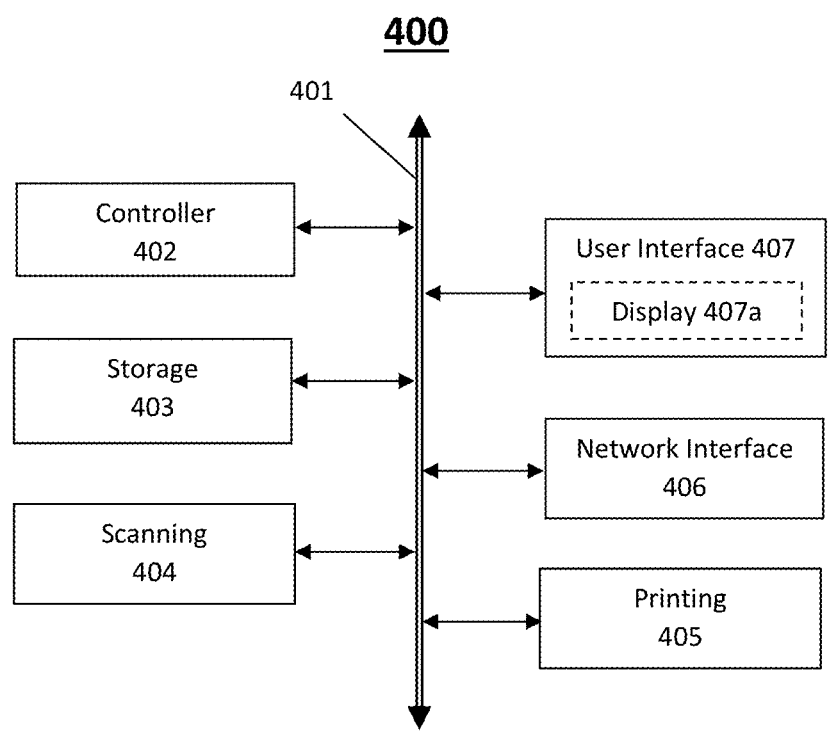
FIG. 4 shows a block diagram of an example of a configuration of a multi-function device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the output device 400, so as to allow the operator to interact conveniently with services provided on the output device 400, or with the output device 400 serving as terminal for accessing electronic data or other content through the network. User interfaces or other contents received through the network via the network interface 406 can be displayed on the display screen.

The display screen does not need to be integral with, or embedded in, a housing of the output device 400, but may simply be coupled to the output device 400 by either a wire or a wireless connection. The user interface 408 may include keys and/or buttons (such as graphical keys or buttons, or other graphical elements, of a GUI on a touchscreen display 407a) for inputting information or requesting various operations. Alternatively, the user interface 407 and the display screen may be operated by a keyboard, a mouse, a remote control, voice recognition, or eye-5 movement tracking, or a combination thereof.

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc.

Figure 5:
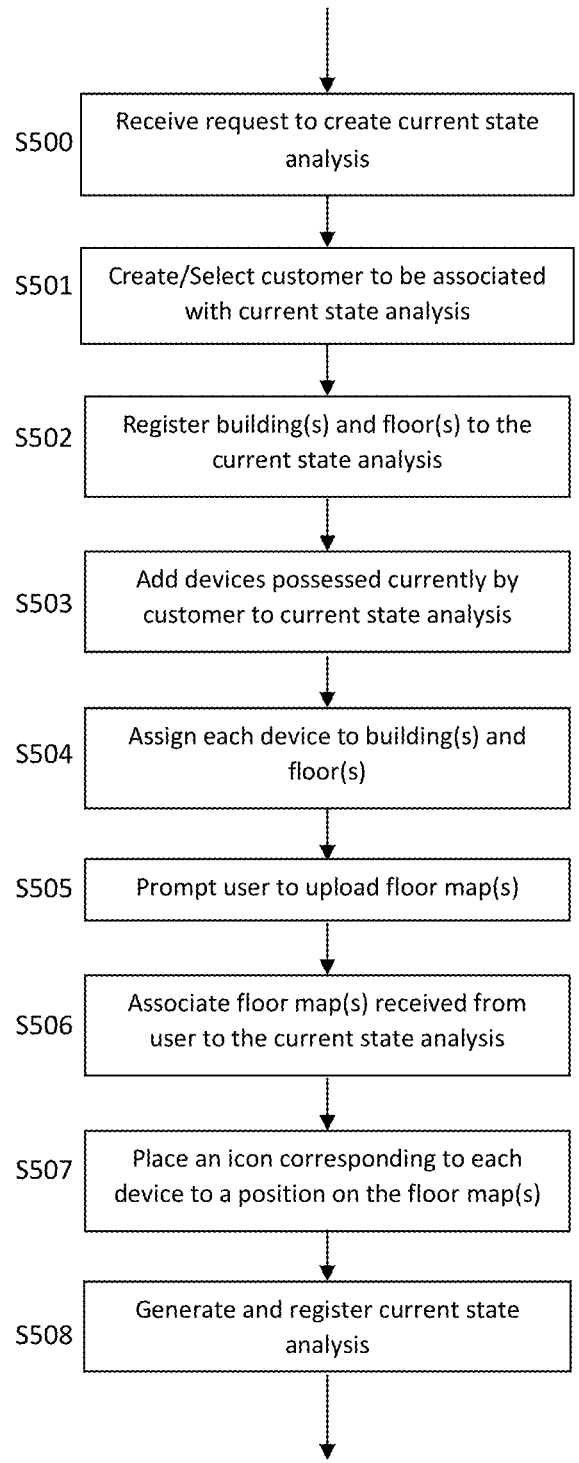
FIG. 5 shows a flow chart of a method, according to an embodiment, which can be performed in any of the systems of FIGS. 1A and 1B.

FIG. 5 shows a method that can be performed by or with a device management application (e.g., 101a) on a terminal apparatus (e.g., 101), according to an embodiment.

Figure 6A:
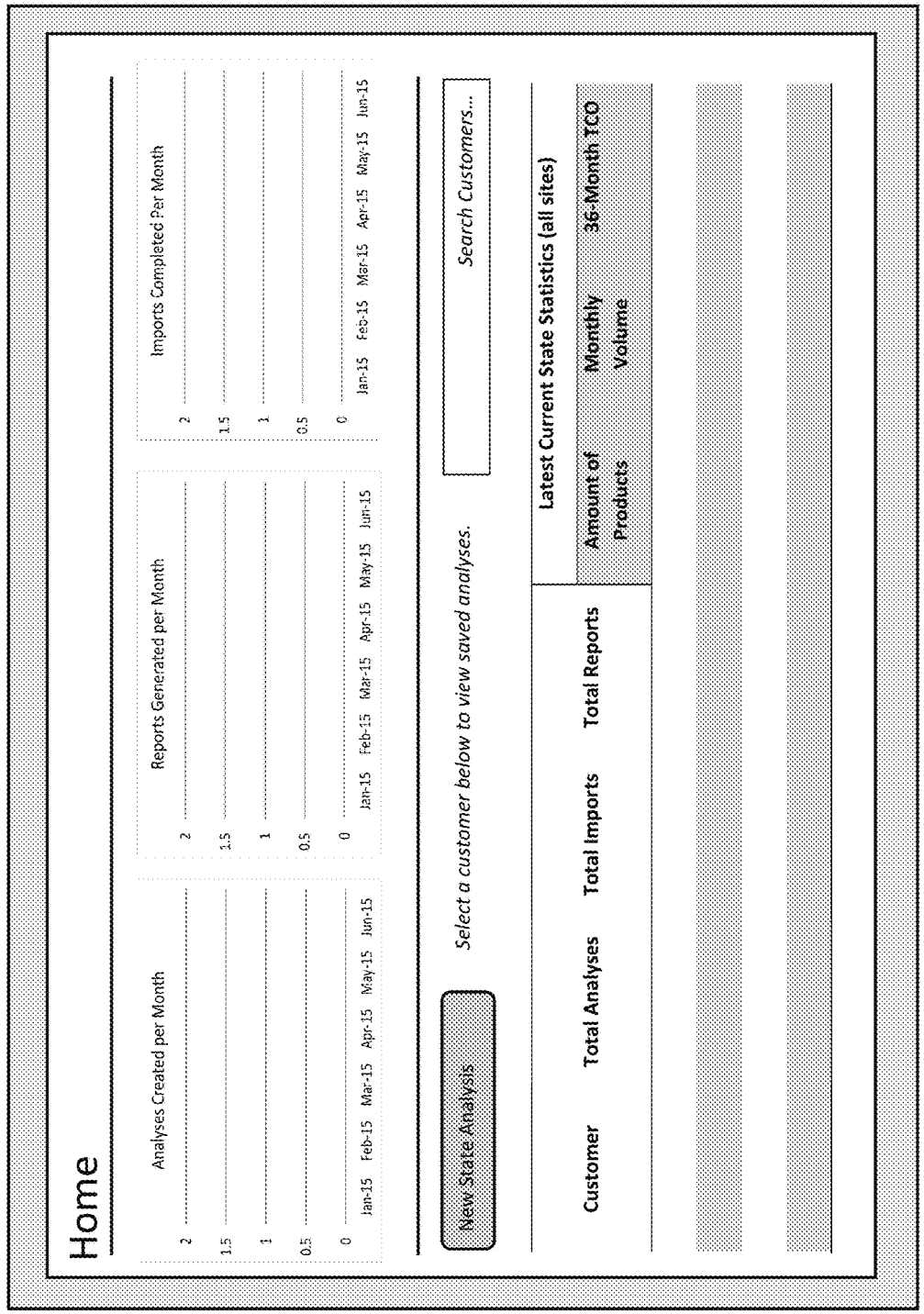
FIGS. 6A-6U show examples of user interface screens which can be provided on a terminal apparatus, according to an embodiment.

In an example of a workflow discussed below with reference to FIG. 6A through FIG. 6U, a manager of customer Vespucci, Inc. determines that an existing contract (i.e. current contract) with vendor Ricoh will expire soon. The manager determines that he wants to try to renew or create a new contract with Ricoh, and therefore the manager contacts Ricoh and asks whether there are any new devices recently manufactured by Ricoh that could replace devices that are in the current contract since the manager thinks that at least some of the devices in the current fleet are outdated. A Ricoh representative (herein "the user") responds to the manager's inquiry and request information regarding what devices are in the current fleet employed by the customer.

The manager explains to the user that Vespucci currently has one office location which includes two buildings with one or more floors. the manager also explains to the user that he wants to replace every device in Vespucci's office with Ricoh devices, along with a diagram of how the Ricoh devices are to be placed on a floor map corresponding to each floor of each building. Thus, the manager requests a proposal of devices that would be suitable for this. In response, the user sends a spreadsheet to the manager and asks him to fill out the spreadsheet with data regarding the current fleet of devices employed by Vespucci. Further, the user also asks the manager to send him information regarding the sites, buildings and floors of Vespucci.

Figure 6B:
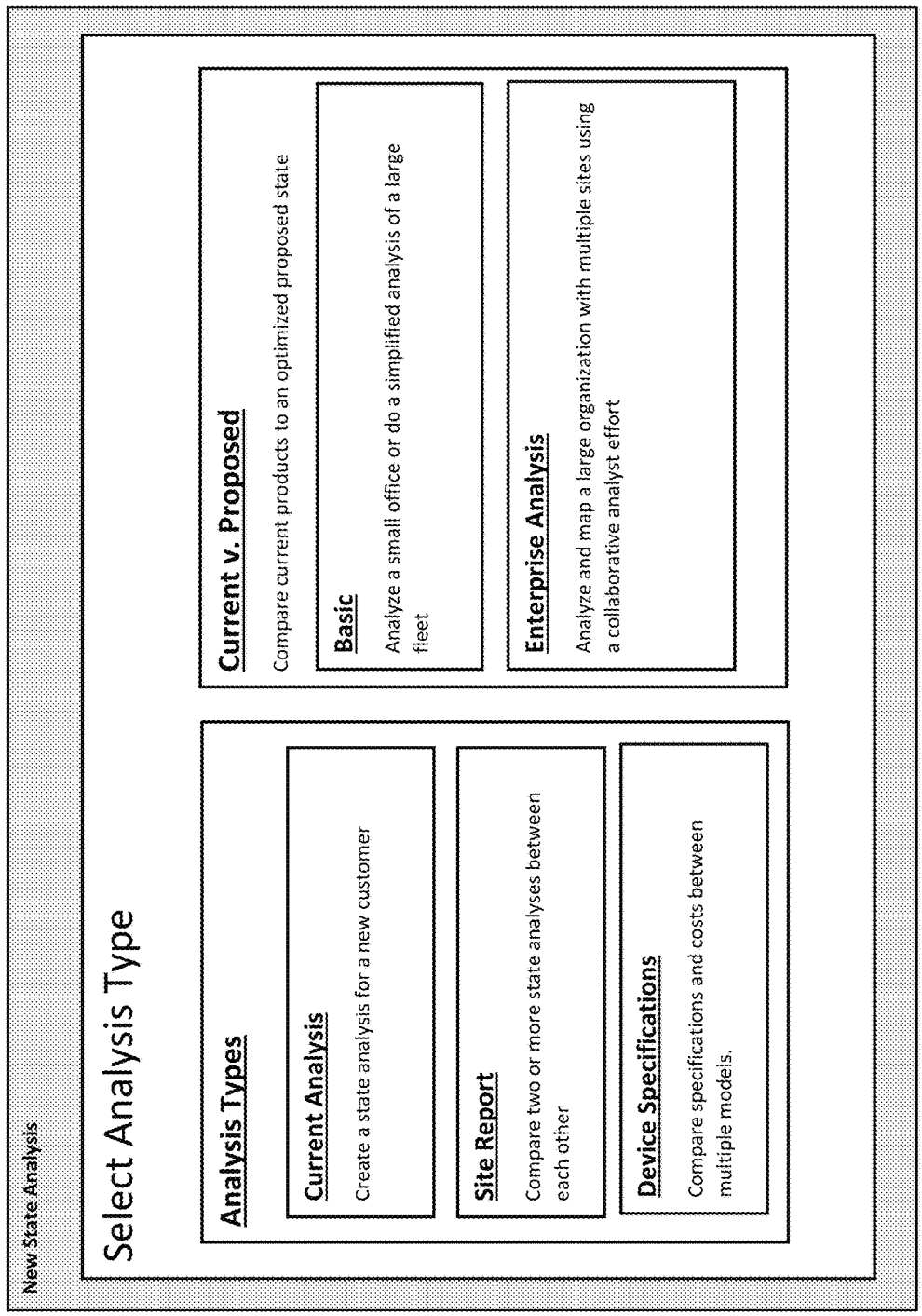

A short while later, the user may receive an e-mail from the manager which contains the completed spreadsheet that includes all of the information regarding the devices in Vespucci's office as well as enterprise information (e.g., site information, building information, floor information, etc.). With this information at hand, the user can now start creating a profile for the customer office. The user commences this action by activating the "New State Analysis" button (S500), such as shown in FIG. 6A. Next, since the user is doing a current state analysis for the customer, he activates the "Current Analysis" button, such as shown in FIG. 6B.

Figure 6C:
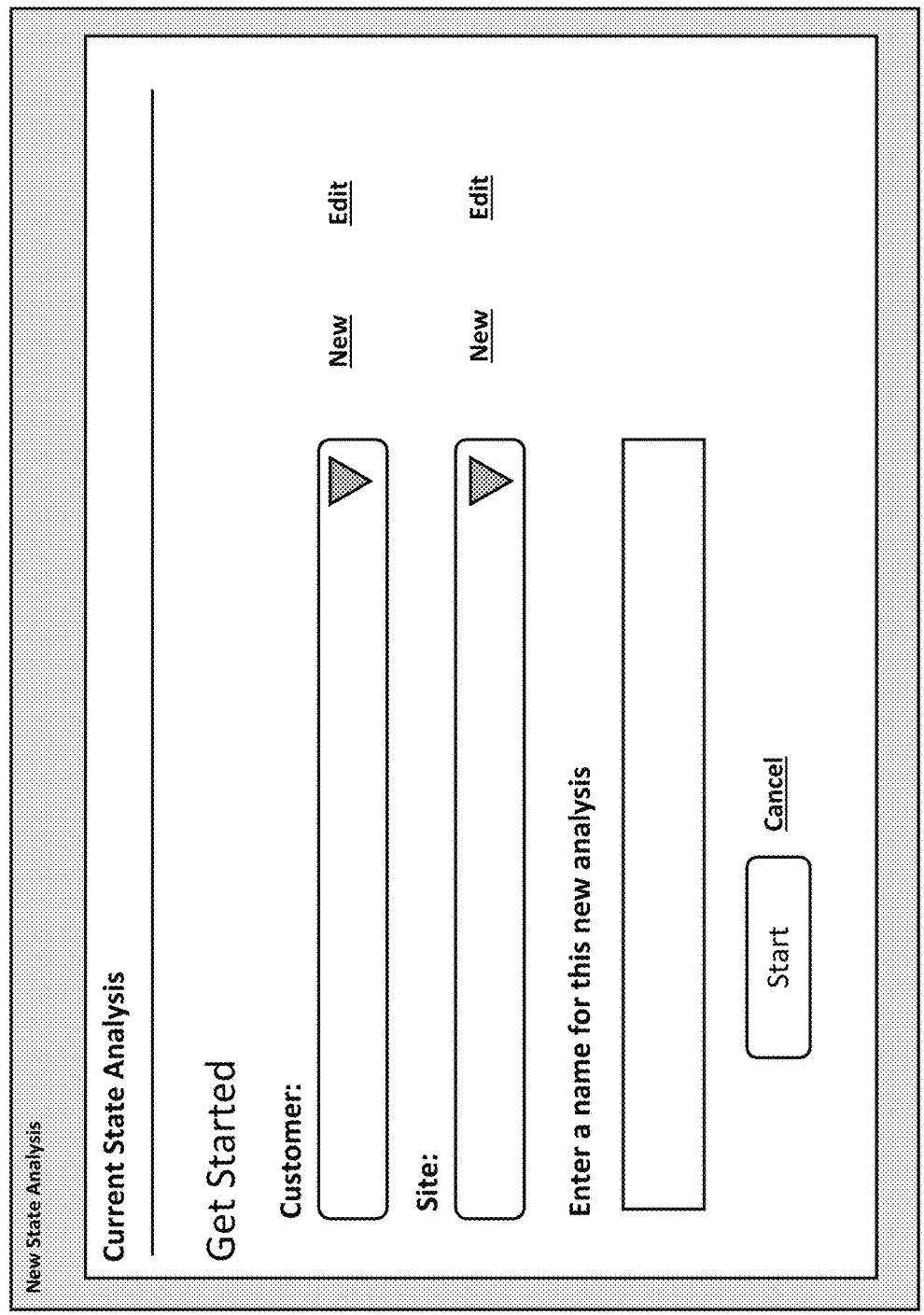
Figure 6E:

Afterwards, the user is shown a screen illustrated by FIG. 6C. Since Vespucci is a new customer, it has not yet been entered into an existing customer list. Thus, the user may add a new customer by activating the "New" button which causes a screen for entering new customer information to be presented to the user (S501) as shown in FIG. 6D. Thus, the user can enter information (e.g., address, phone number, email address, etc.) for recordation. After entering the relevant customer information, the user activates the "Next" button which causes a screen for entering enterprise information to be presented to the user, as shown in FIG. 6E.

Figure 6F:
Figure 61:
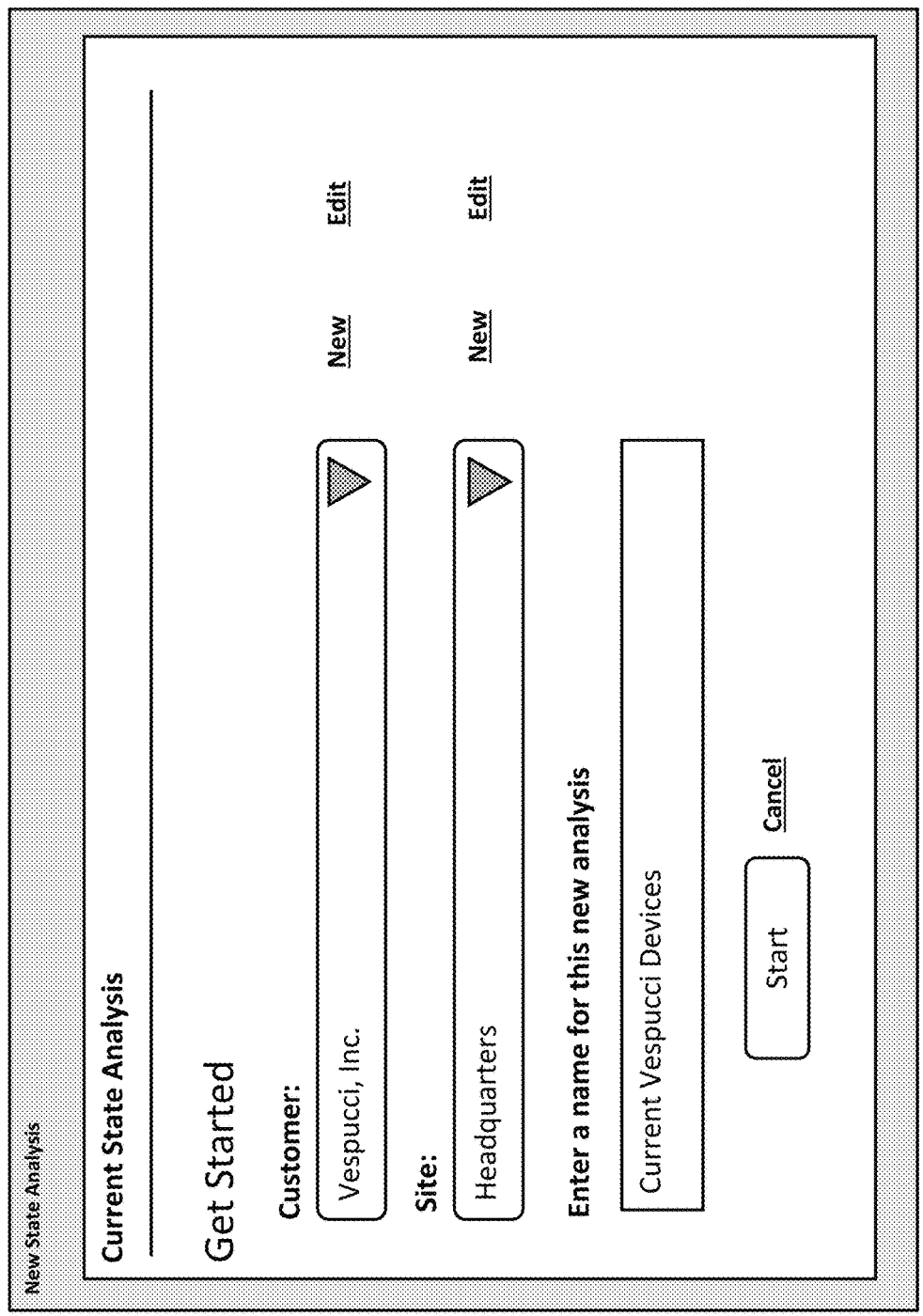

Here the device management receives enterprise information (e.g., site, buildings, floors, etc.) from the user (S502). In the first step for entering enterprise information, the device management application prompts the user to enter information regarding the number of sites (e.g., city, town, village, etc.) that the customer is located at. Next, using the information obtained from the manager in the email, the user inputs the number of sites as "1" (i.e. since the customer is located at only one site in this example) and names it "Headquarters". Then, the user activates the "Next Step" button causing the device management application to prompt the user to enter building information associated with the site, as shown in FIG. 6F. Again, using the information obtained from the manager in the email, the user enters the number of buildings as "2" and names each building as "Main Office" and "Recreation".

Figure 6G:
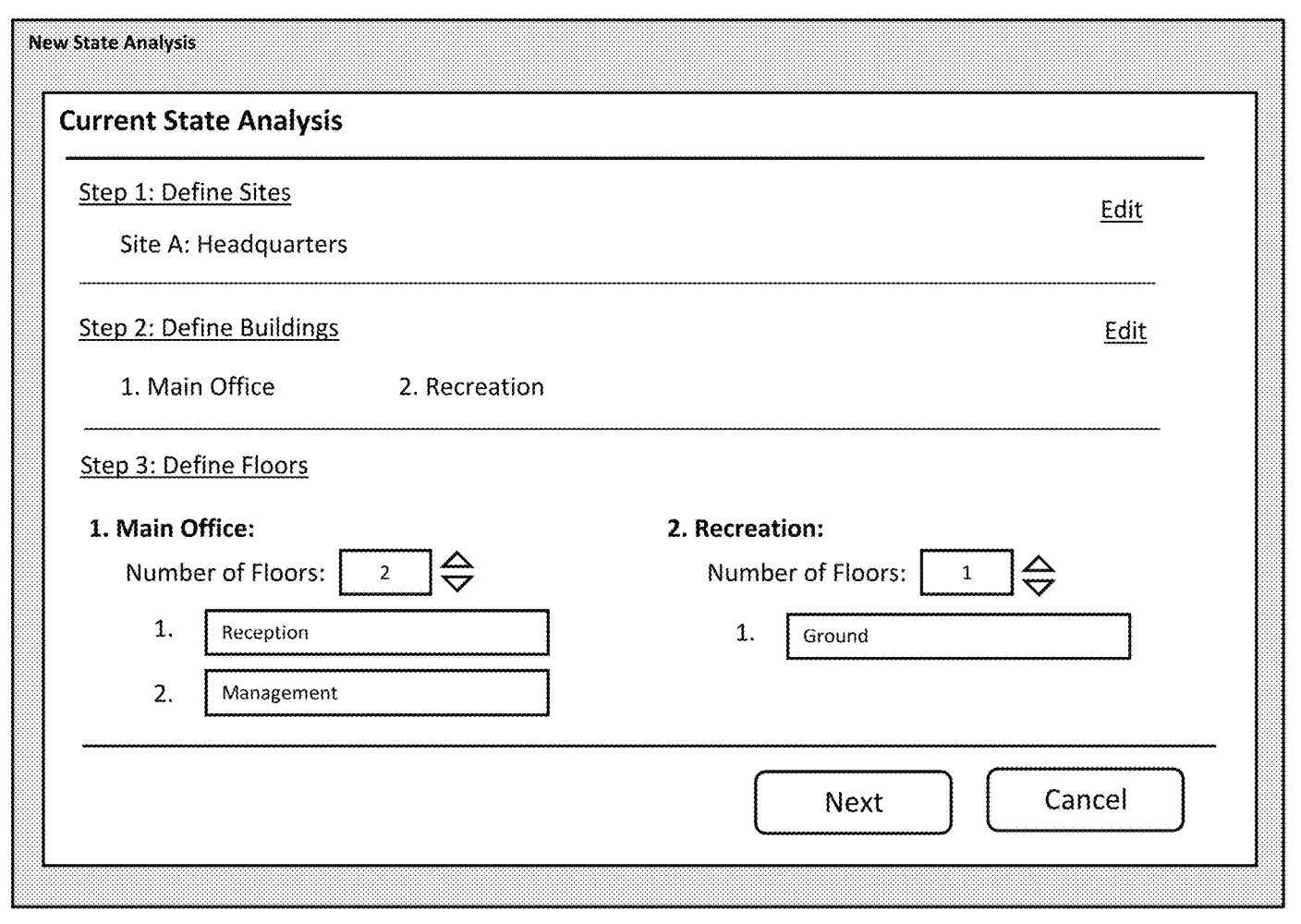

Next, the user activates the "Next Step" button causing the device management application to prompt the user to enter floor information associated with each building, as shown in FIG. 6G. Thus, once again using the information obtained from the manager in the email, the user enters, for the Main Office building, the number of floors as "2" and names each floor as "Reception" and "Management". Likewise, the user enters, for the Recreation building, the number of floors as "1" and names the floor as "Ground". After the user is finished with entering the information, the device management application presents a screen to the user as shown in FIG. 6I1, to allow the user to review the information previously inputted.

Once the user is satisfied with the customer information entered, he may activate the "Finish" button which causes the device management application to return to the screen shown in FIG. 6C. Now, as shown in FIG. 6I, the user can select the customer (i.e. Vespucci, Inc.) and site (i.e. Headquarters) information from the drop down menu. Further, the user can also create a name (i.e. Current Vespucci Devices) for this current state analysis. After the user has activated the "Start" button, he can begin adding devices to the current state analysis corresponding to the customer (S503). the user can do this by electronically uploading the spreadsheet received from the manager.

This may be performed when the device management application requests the user to import information regarding the devices employed by the customer, such as shown in FIG. 6J. Further, the user may also view the file given to him by the manager, such as shown in FIG. 6K. As shown, each device is shown with information (e.g., properties, building location, floor location, etc.). Thus, in this case, once the device management application receives information regarding which building or floor the devices are located at, the device management application assigns the devices to the corresponding building and floors (S504).

In an exemplary scenario, the file including the information of each device at a certain site (e.g., Headquarters) may not be complete. It may be that records were destroyed or lost causing the manager to partially fill out the form. In another example, it may be that the manager forgot to fill in certain information, such is indicated by the blank spaces in the spreadsheet shown in FIG. 6K. It should be noted that in the case that there is an identifier "N/A" in the spreadsheet, it does not mean that the manager to does not know the value regarding that particular information. Instead, the manager understands that such value may not exist. For example, a device "Workforce" may have an "N/A" under the category "Rental Price" because the device "Workforce" cannot be rented (i.e. only purchasable) and not because the manager doesn't know what value to put in that category.

Thus, when there is incomplete information in the table of devices, the user can complete the table by activating the "Fill in Blanks" button which causes the device management application to communicate with a third party source (e.g., Amazon, Best Buy, Newegg, Staples, PC Richard and Son, etc.) to obtain information that can complete the table. It should be noted that the device management application may not be able to fill in every blank space. For example, the building and floor information for Artisan is missing. However, the device management application may not know what value to place in for that category. Once the table is completed, such as shown in FIG. 6L, the user can save the completed table by activating the "Save As" button which causes the file to be saved as "VespucciDevices(rev).xlsx", such as shown in FIG. 6M.

Figure 6N:
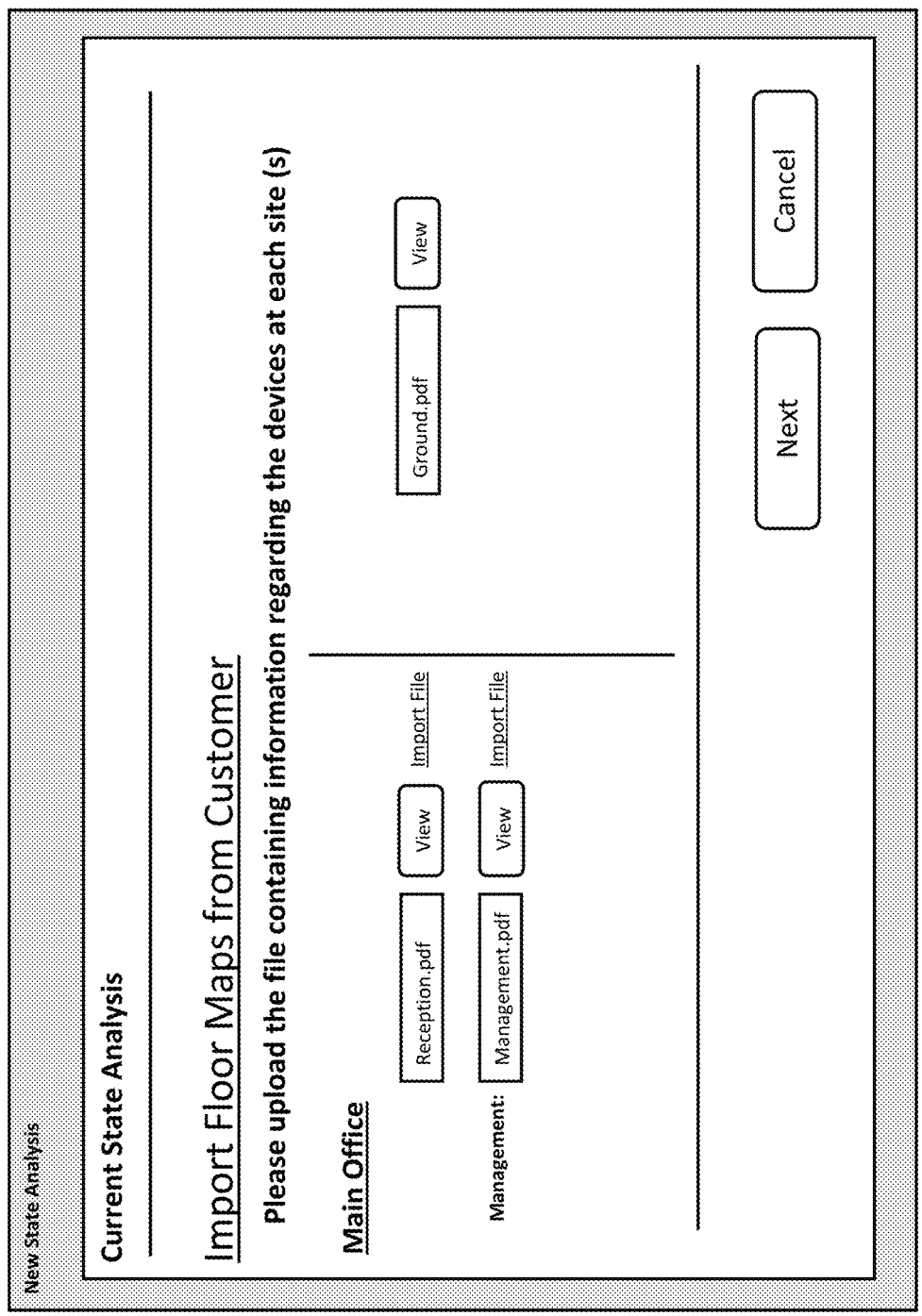
Figure 60:
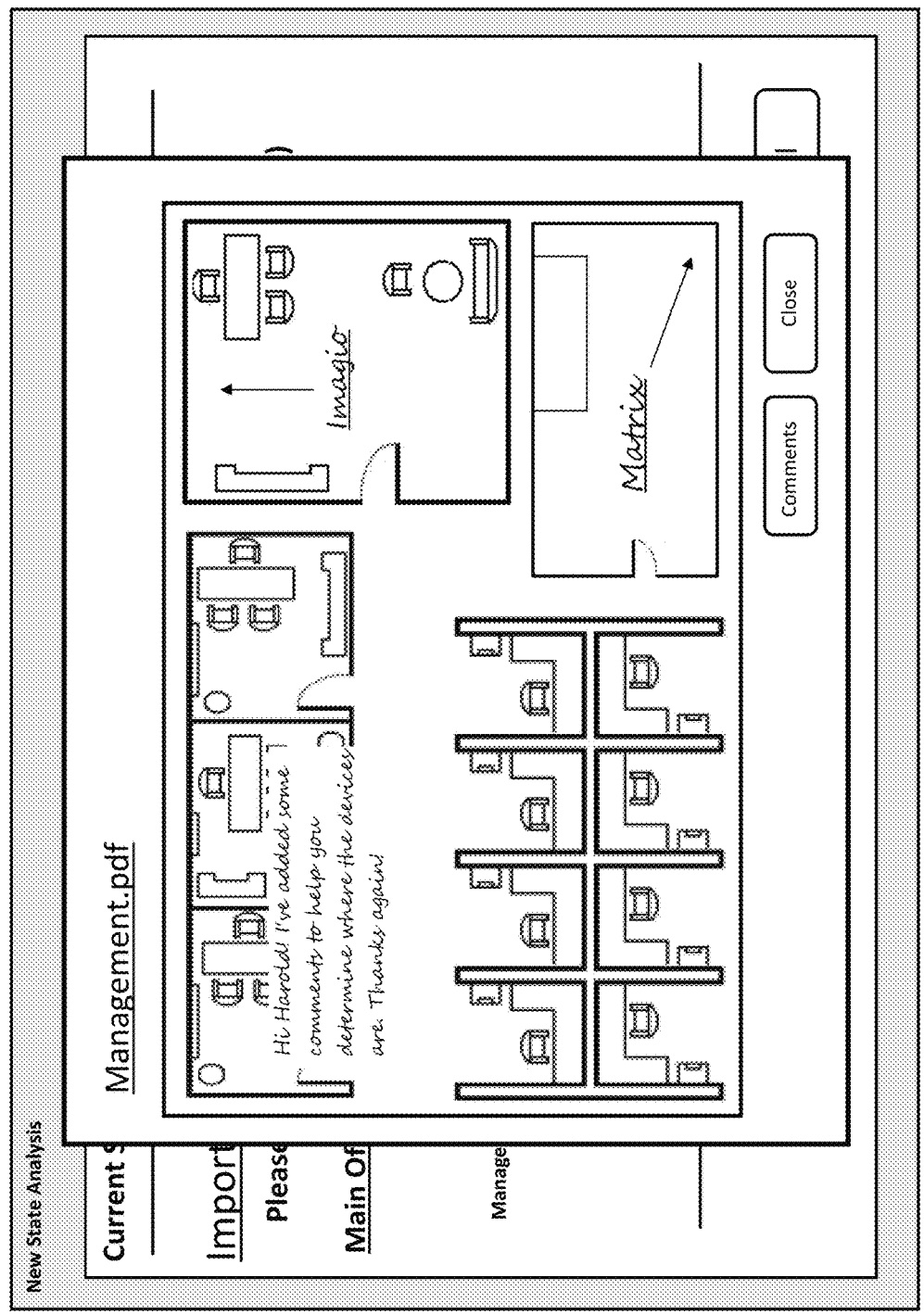
Figure 6P:
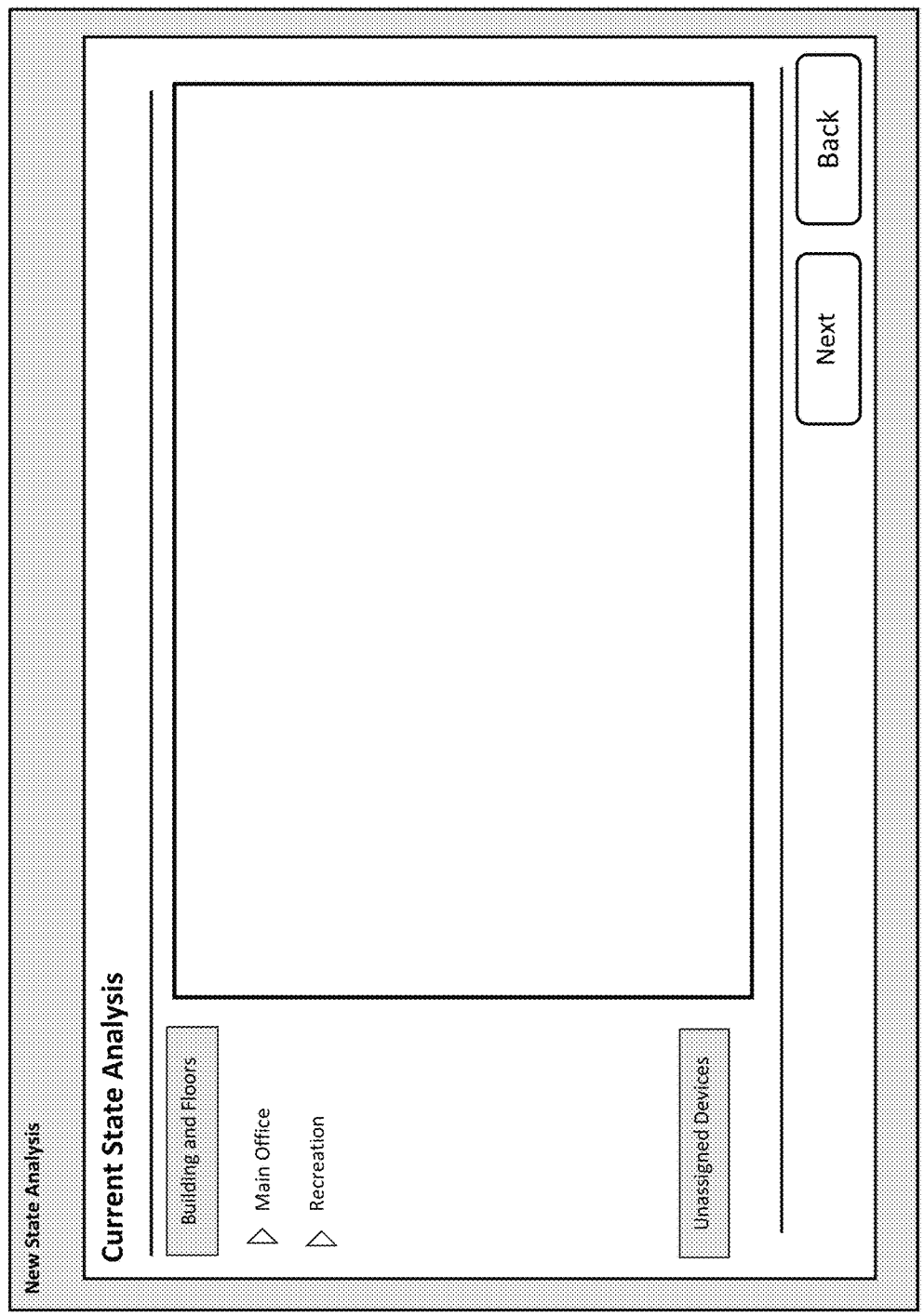

Next, when the user activates the "Next" button, the device management application prompts the user to upload floor maps received from the manager in the email to be processed by the device management application (S505), as shown in FIG. 6N. Once the user has uploaded at least one floor map, he can view the uploaded floor map as shown in FIG. 6O. Here, the user may activate the "Comments" button which includes comments made by the manager to inform the user of where the devices are physically located on the map (corresponding to real-life). After the user is satisfied with the floor maps that he uploaded, the may activate the "Next" button, which causes the device management application to associate the floor map with the current state analysis (S506). In addition, the device management application also presents a screen to the user as shown in FIG. 6P.

Figure 6Q:
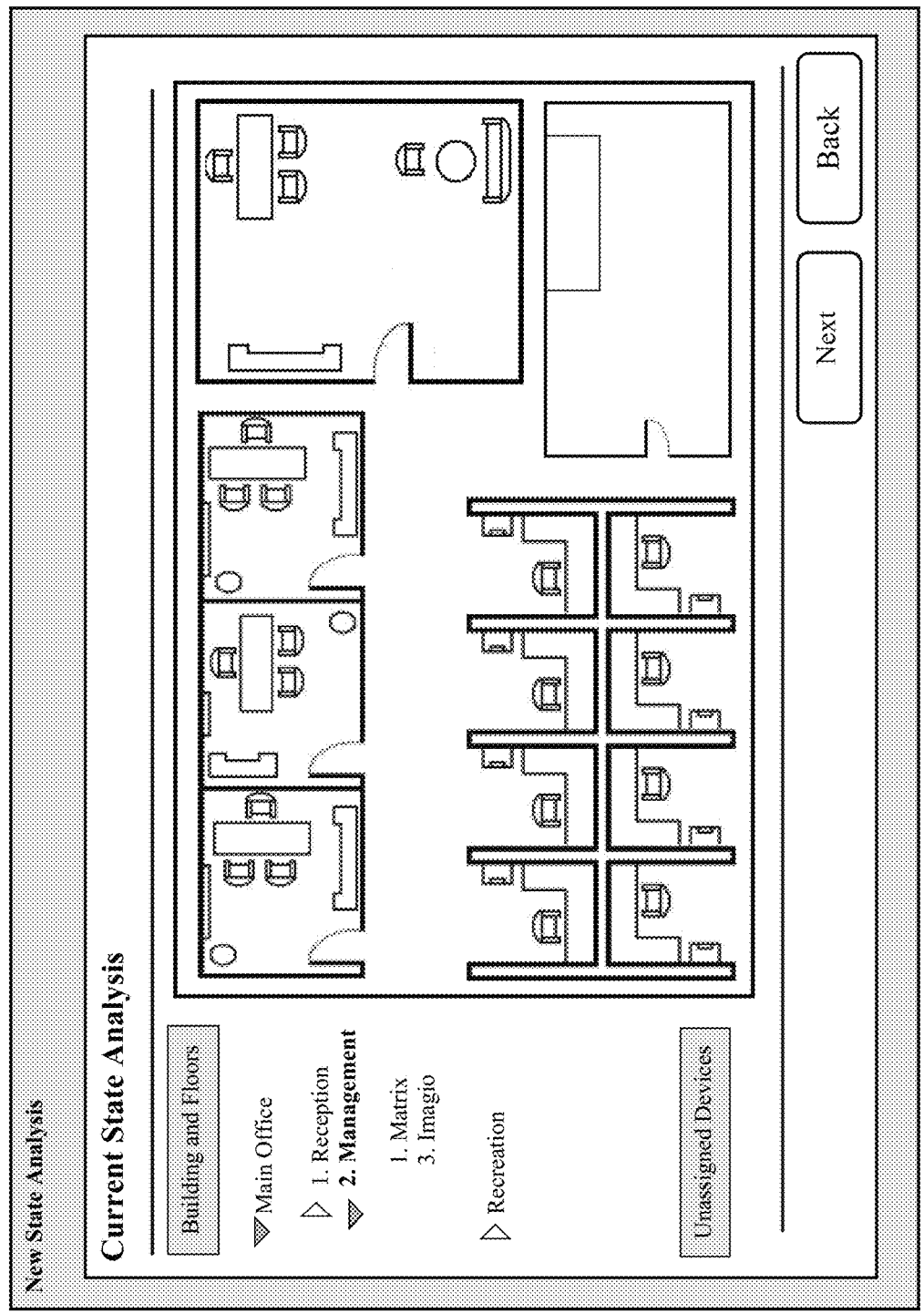
Figure 6R:
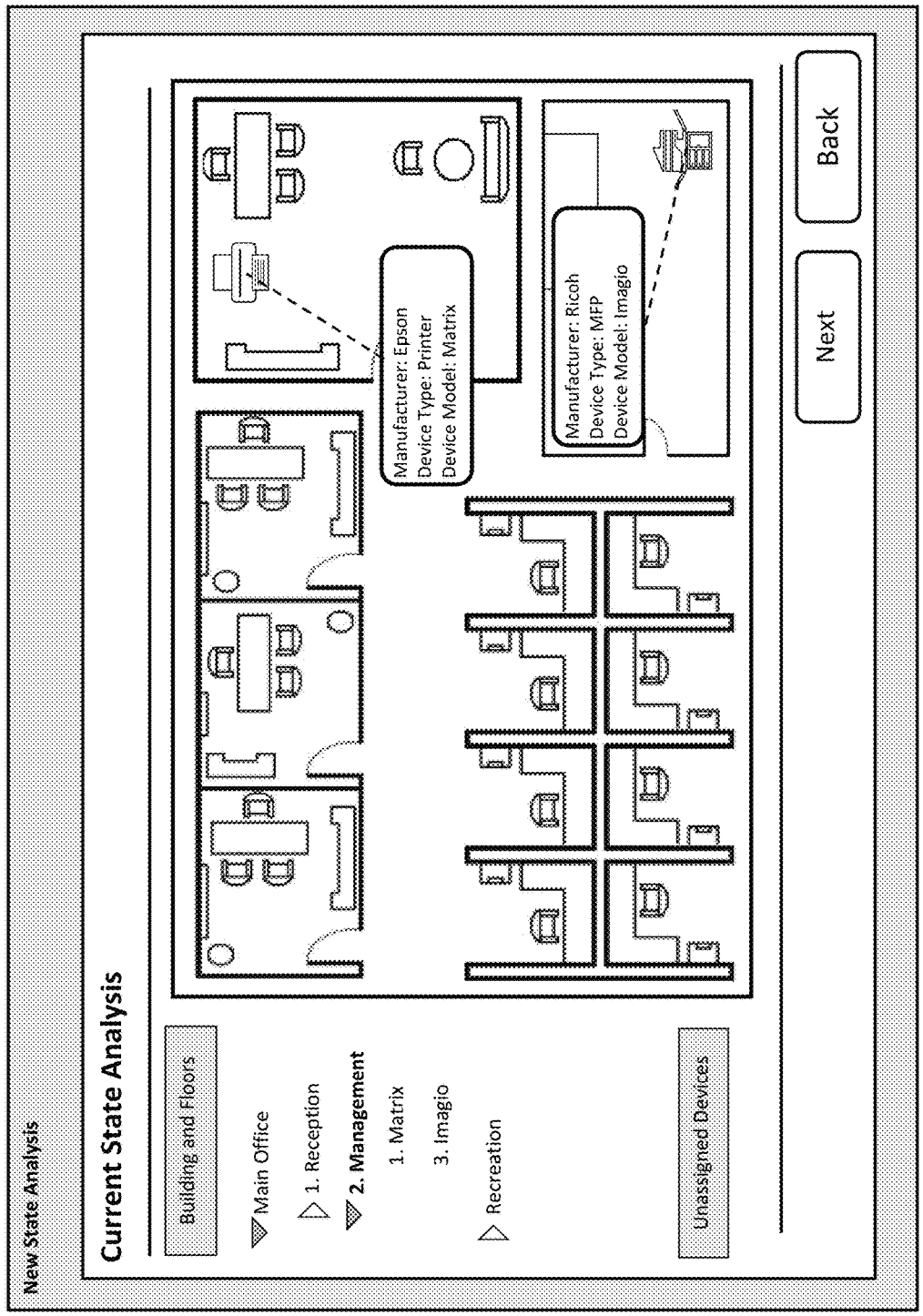

Here, the user may select a building and corresponding floor using the drop-down options in the menu on the left side of the screen, which causes the device management application to display the devices associated with that building/floor. The device management application may determine which devices are associated with which floor via the spreadsheet uploaded by the user previously. Further, once the user has selected a floor, the corresponding floor map is presented to him by the device management application, as shown in FIG. 6Q. Next, the user can select the devices in the menu on the left side of the screen and perform a drag-and-drop action in which the user drags the devices onto the floor map (S507). Once the user has placed a device to a particular location on the floor map, a comment box is automatically generated as shown in FIG. 6R. Such comment box is associated with the device and includes information regarding the device.

Figure 6S:
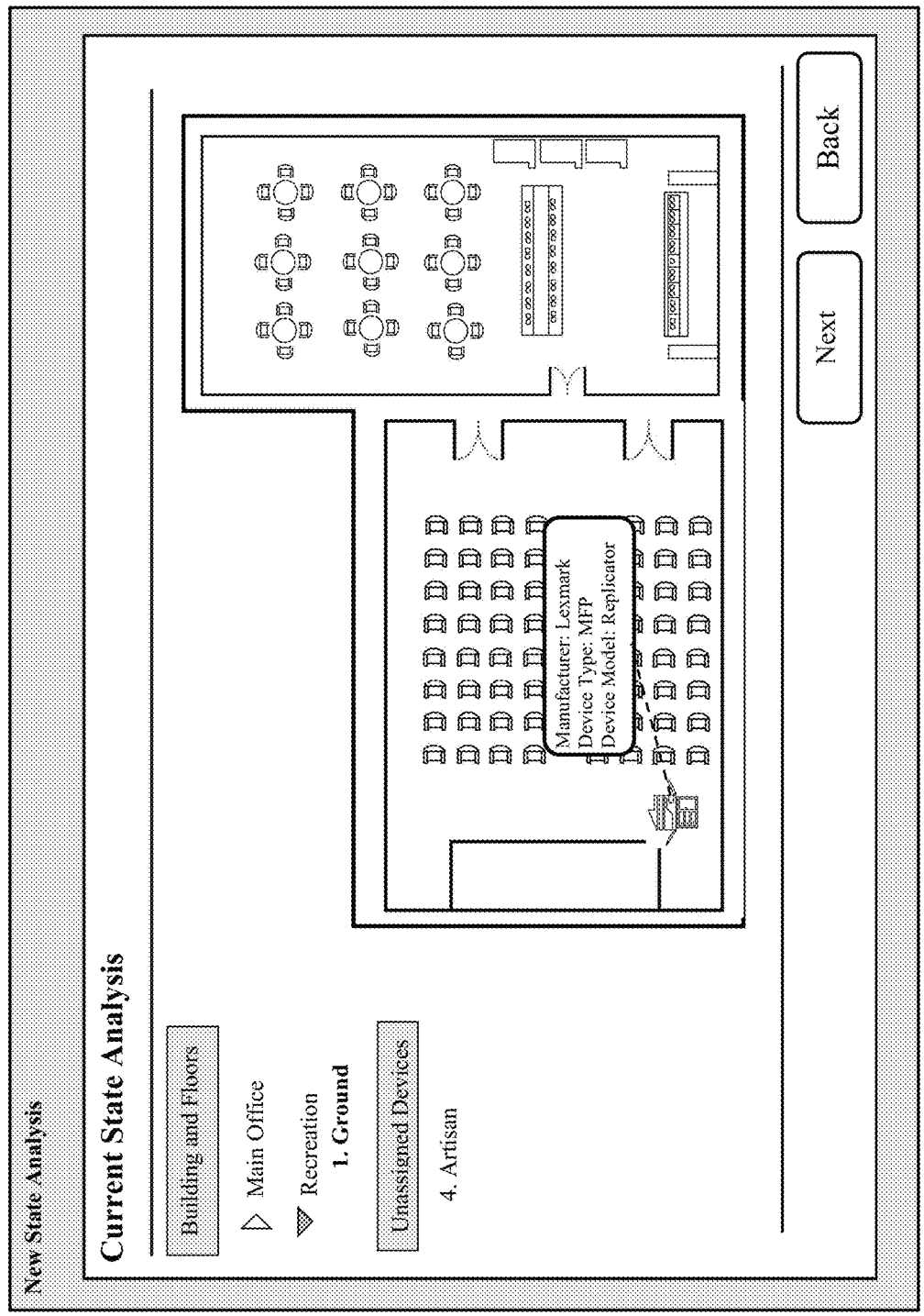
Figure 6T:
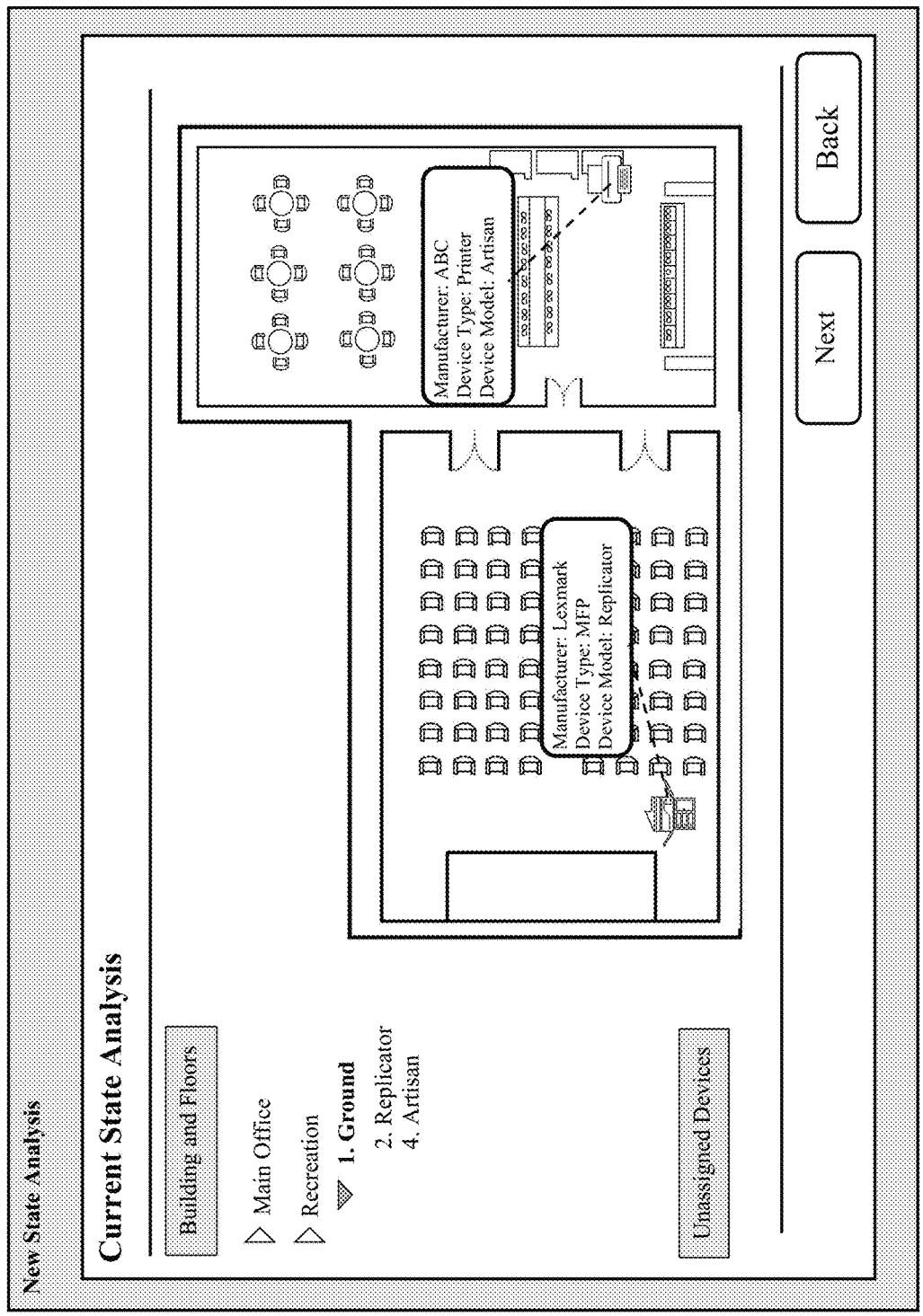

In an embodiment, when one or more devices in the spreadsheet are not assigned to a particular building or floor, such devices are placed under the "Unassigned Devices" menu option. Thus, when the user activates the "Unassigned Devices" menu option, he is presented with a list of one or more devices that are not yet assigned as shown in FIG. 6S. For example, in this case, the device Artisan is not assigned. Thus, the user may drag-and-drop Artisan to a particular floor map to assign it. In the case that that occurs, the device Artisan is no longer unassigned and is assigned to the floor map that it was dragged-and-dropped to. For example, the user may communicate with the manager to request for the location of Artisan, since the manager had forgotten to put it into the spreadsheet. Thus, after receiving the information from the manager, the user may drag-and-drop Artisan to the Ground floor or the Recreation building as shown in FIG. 6T. Thus, Artisan is no longer unassigned and is now associated with a floor.

Figure 6U:
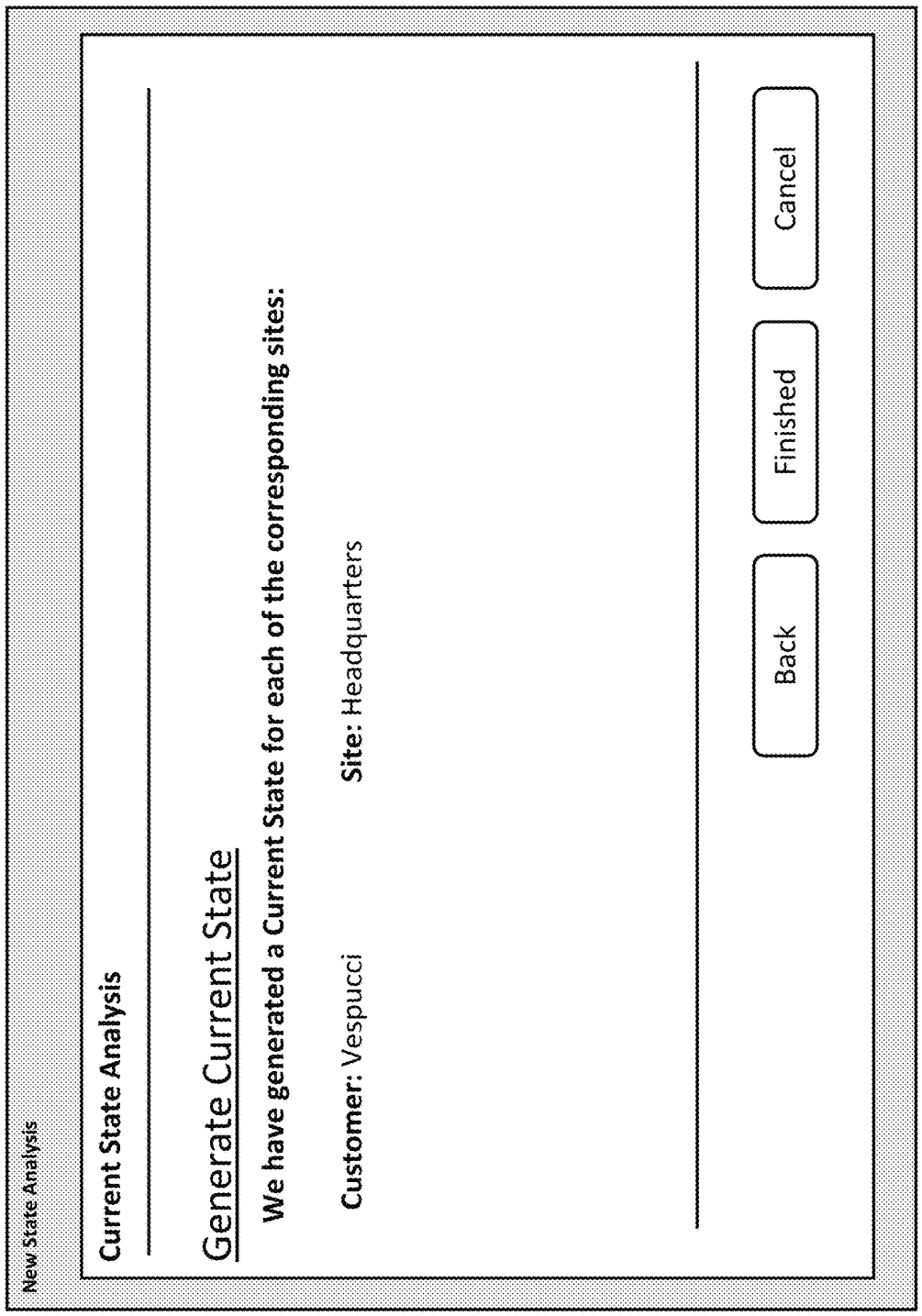

Next, after the user is satisfied with the placement of the devices currently employed by the customer in the floor maps, he may activate the "Next" button which causes the device management application to generate current state analysis for the customer (S508), such as shown in FIG. 6U.

Figure 7:
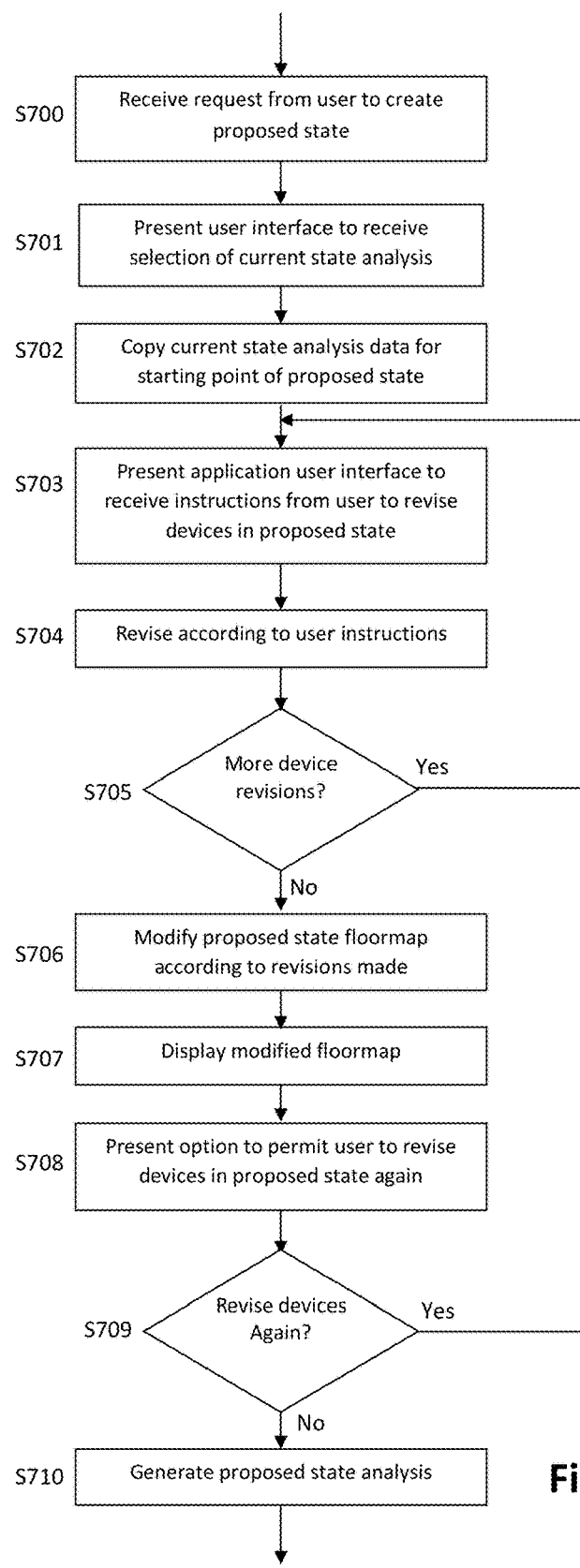
FIG. 7 shows a flow chart of a method, according to an embodiment, which can be performed in any of the systems of FIGS. 1A and 1B.

FIG. 7 shows a method that can be performed by or with a device management application (e.g., 101a) on a terminal apparatus (e.g., 101), according to an embodiment.

Figure 8A:
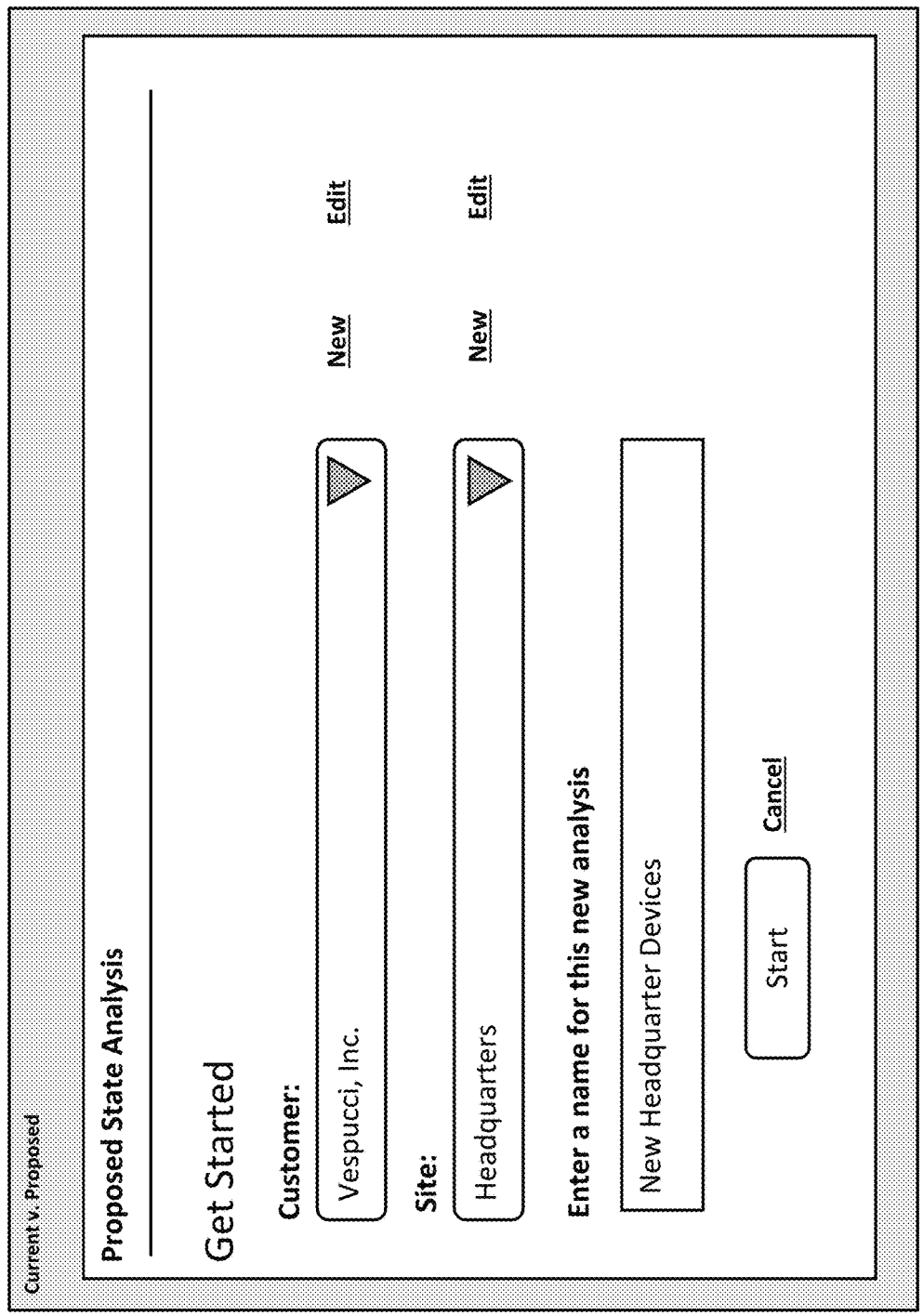

Thus, after creating the current state analysis, the user can create a proposed state based on said current state analysis by activating the "Basic" button (e.g., in FIG. 6B). After receiving instructions from the user to create a proposed state analysis (S700), the device management application presents the user with the screen to receive selection of a current state analysis as a basis for the proposed state analysis (S701), as shown in FIG. 8A. In this case, the user has selected Vespucci, Inc. as the customer and selected the corresponding site as Headquarters. After receiving selection of the current state analysis, the device management application creates a copy of the current state analysis for a starting point of the proposed state (S702).

Subsequently, the device management application presents a screen to receive instructions from user to revise devices in proposed state (S703), as illustrated in FIG. 8B. As shown, the user is presented with every device model that existed in the corresponding current state analysis. Further, the user is given options to (i) modify each device, (ii) keep each device, (iii) replace each device or (iv) delete each device.

Figure 8C:
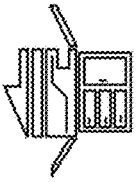

For example, the user may wish to delete the Matrix device or replace it with a device manufactured by Ricoh. Thus, the user activates a corresponding "Replace/Delete" button which causes the device management application to present a screen as shown in FIG. 8C. Here, the user is shown the original device that is to be replaced (along with its properties) and a search box. The user may search for a replacement device via the search box. When such replacement device has been found, the replacement device information is displayed, and the user may select a radio button corresponding to the replacement device and activate the "Replace" button to replace the original device with the replacement device. In contrast, the user may select to delete the original device by selecting a corresponding radio button and activating the "Delete" button.

Figure 8D:
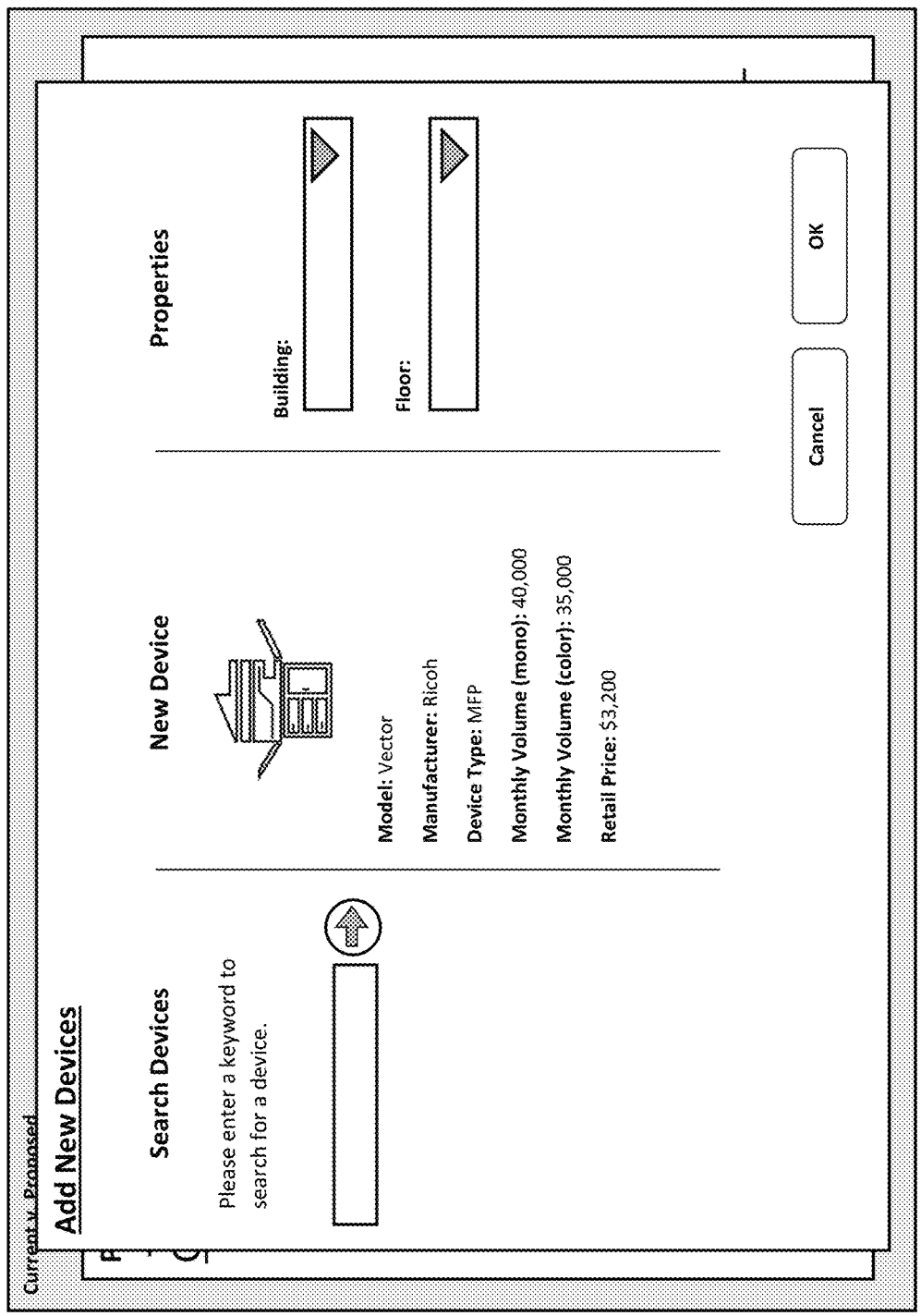

In another example, the user may wish to add a new device to the list by activating an "Add" button. Thus, the device management application to presents to the user a screen as shown in FIG. 8D. Like previously, the user can search for a device using a search box provided. Once the user has found a device, he may include information on where to put the device (i.e. site, building, floor, etc.).

Thus, after receiving instructions from the user to revise the proposed state, the device management application performs the revisions accordingly (S704). An example of such revision is illustrated in FIG. 8E. As stated previously, the objective of the user is to replace all devices currently employed by the customer with device manufactured by Ricoh. Further, the user may also add device based on his best judgement. Thus, the devices Matrix and Replicator (which are not manufactured by Ricoh) are replaced with devices that are manufactured by Ricoh. On the other hand, the device Imagio (which is manufactured by Ricoh) is kept. In addition, the user may delete Artisan from the list and add another device Vector as well. The user may do this since he does not want to replace the device Artisan with the device Vector. This may be because by performing the replacement, the device Vector is automatically positioned at the same location as Artisan. Thus, since the user does not know yet where to place the device Vector, here merely adds it as a new device.

Next, the device management application determines if anymore revisions are to be made (S705). In the case there are more revisions (S705, yes), the process repeats. Otherwise (S705, no), the device management application modifies the proposed state floormap according to the revisions made previously (S706). In other words, when the current state analysis selected by the user was copied to create a proposed state to which the user could perform editing, the device management application also copied the floormaps that are associated with the selected current state analysis. Thus any changes made to the devices in the proposed state is reflected in the copied floormaps.

Figure 8F:
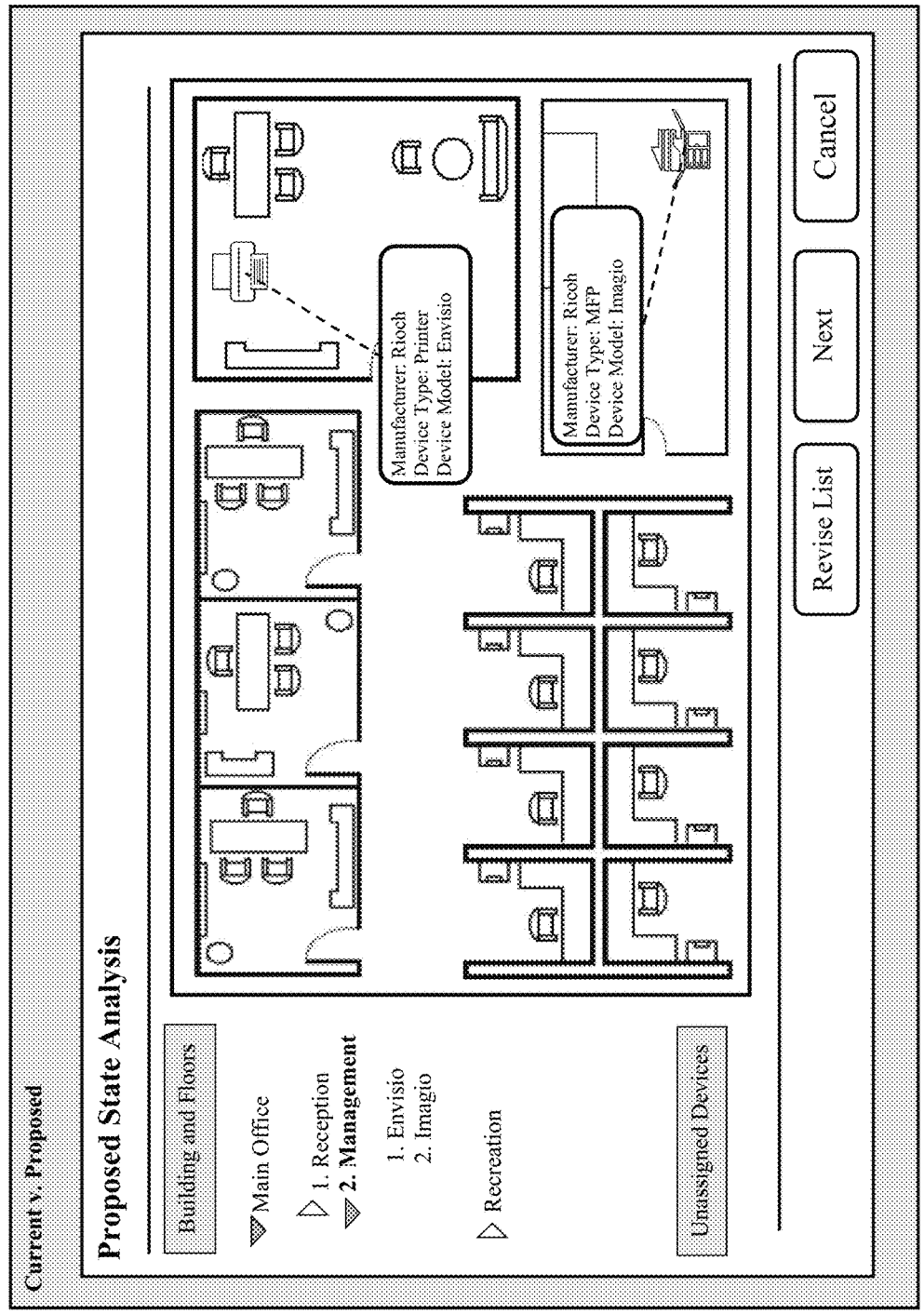
Figure 8G:
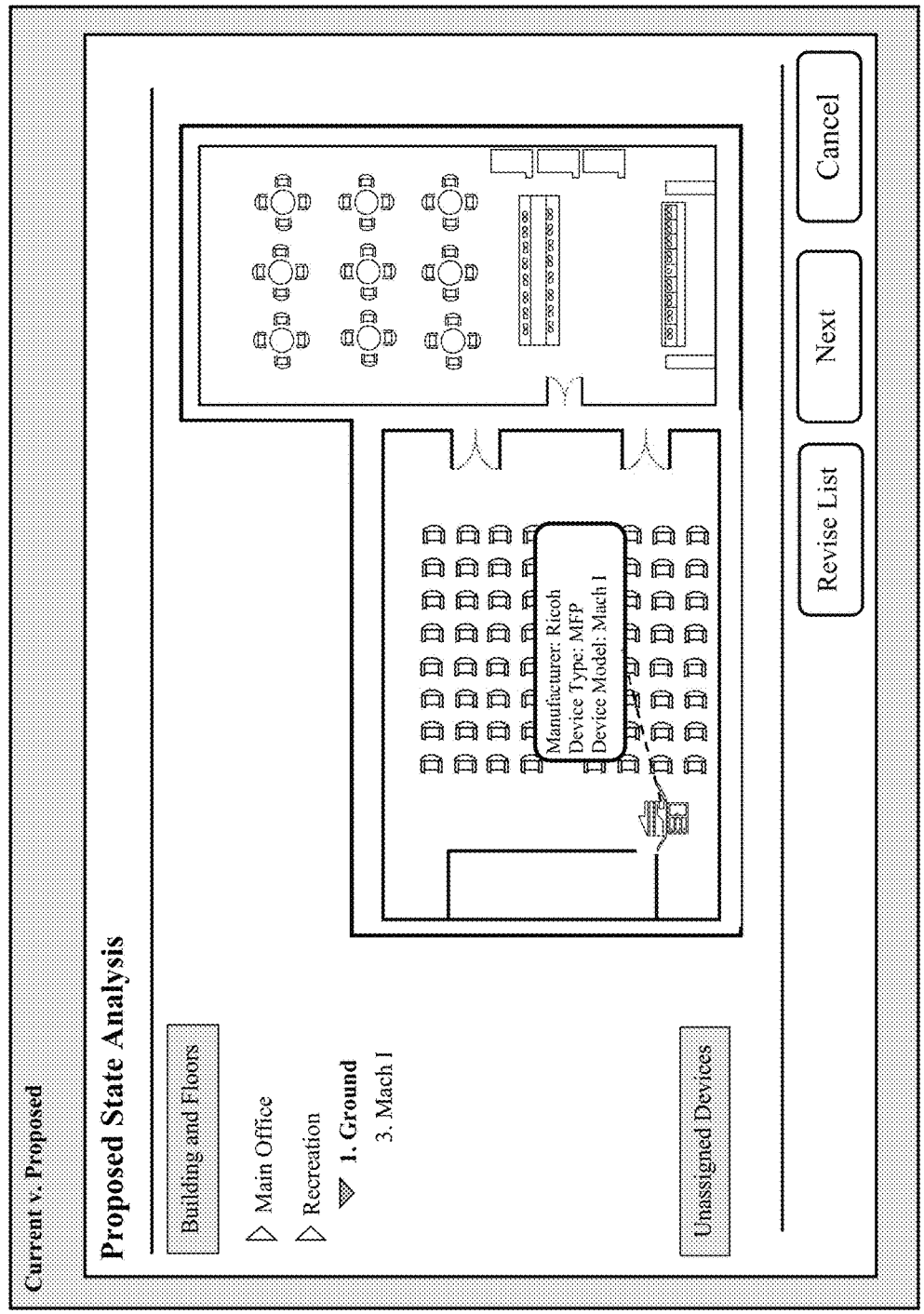

After the floormaps are modified, the device management application presents the user with the modified floormaps (S707) as shown in FIG. 8F. As shown, for example, in FIG. 6R, in the current state analysis, the floor Management of the building Main Office includes two devices (i.e. Imagio and Matrix). Since the device Matrix has been replaced by the device Envisio, the floormap shows this change accordingly. Thus, the comments change to reflect this new revision. However, as the device Matrix has been replaced by the device Envisio, the device Envisio is now disposed at the same position as the device Matrix. Likewise, the device Mach I has replaced the device Replicator, such as shown in FIG. 8G, and consequently, the device Mach I is disposed at the location previously occupied by the device Replicator. In addition, since the device Artisan was deleted, it is no longer shown in the floormap illustrated in FIG. 8G.

Figure 8H:
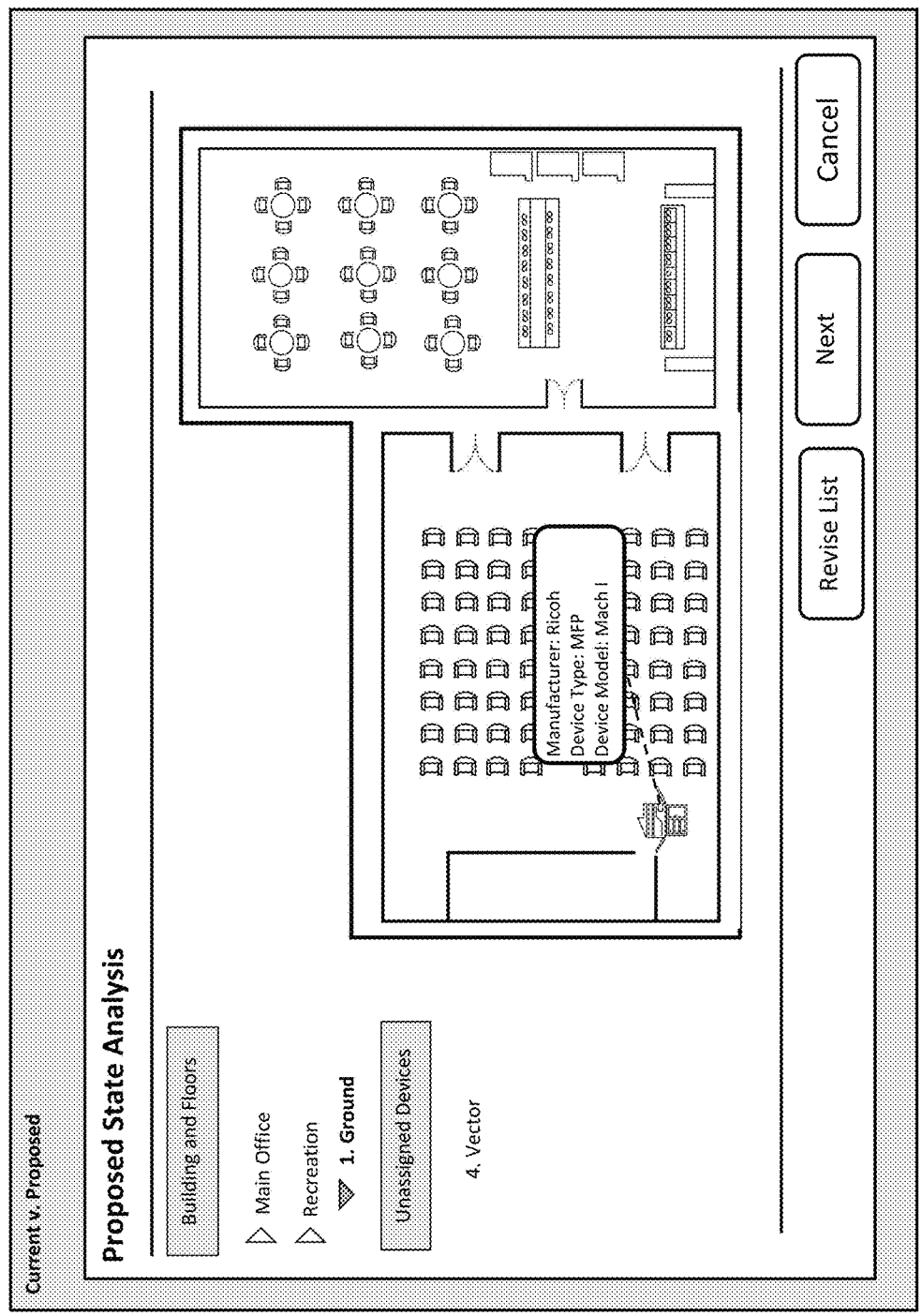
Figure 8I:
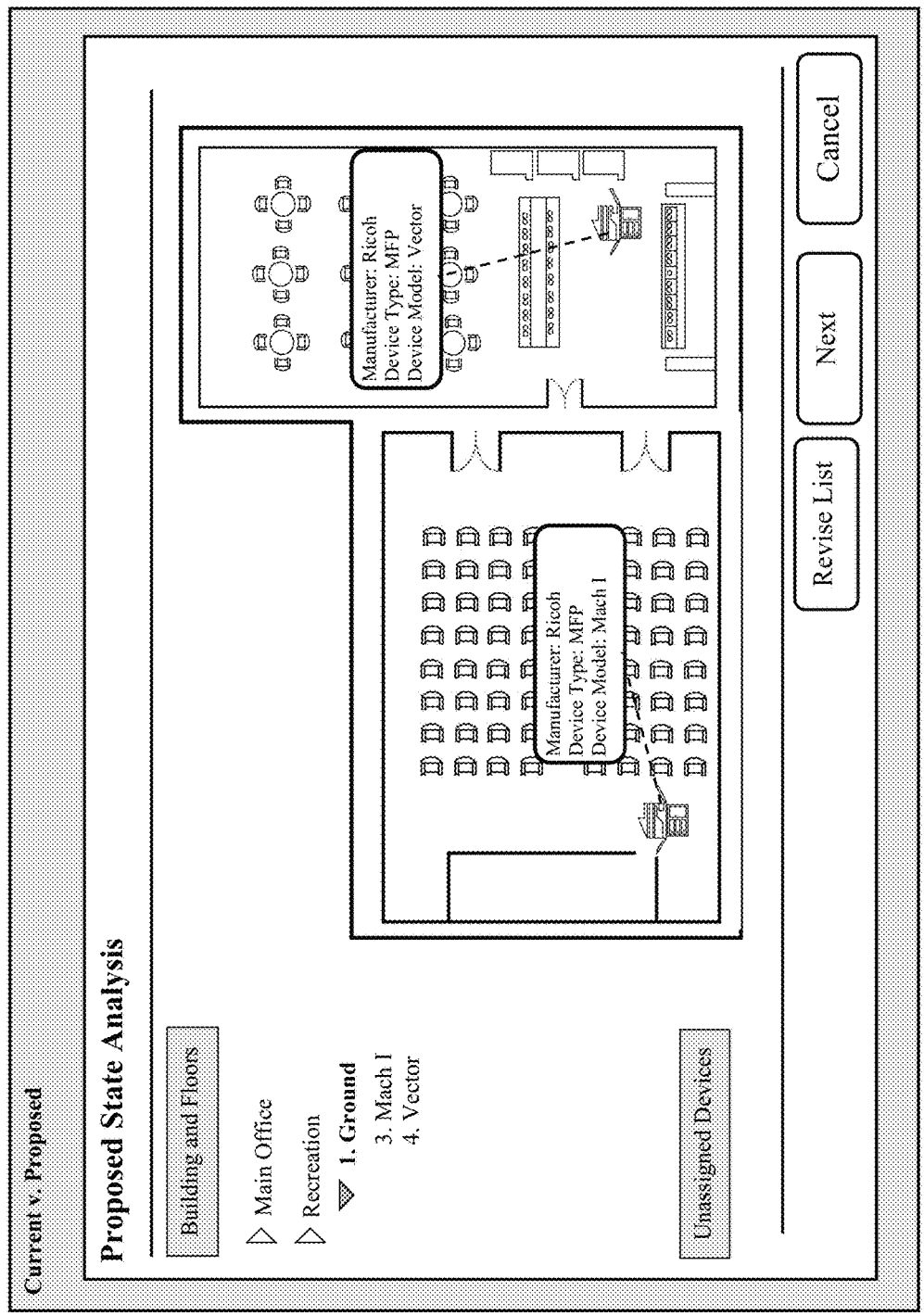
Figure 8J:
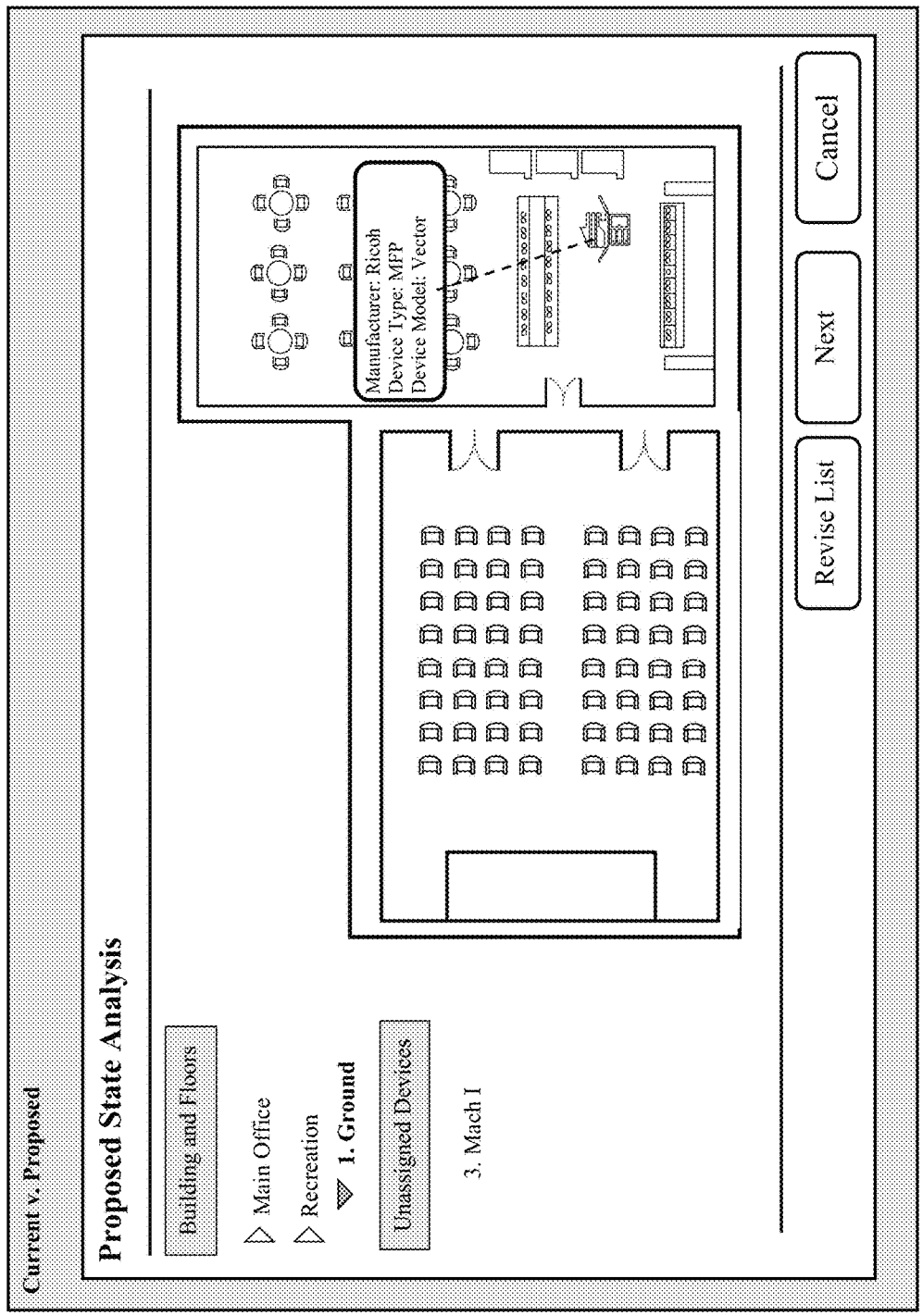
Figure 8K:
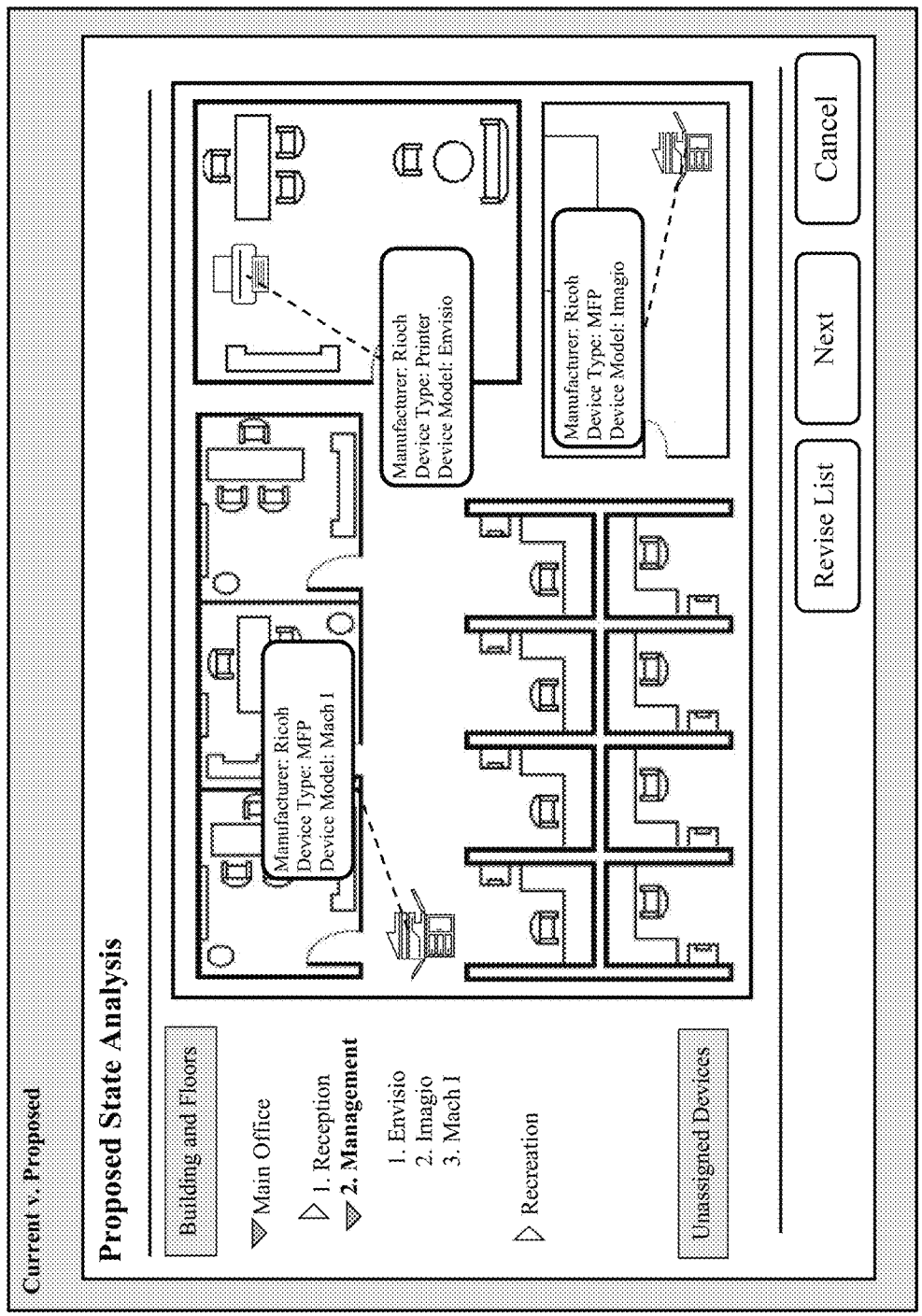

Next, the user may assign any unassigned devices to a floormap. In FIG. 8H, the device Vector is not assigned to any floormap. Thus, the user may drag-and-drop the device Vector from the unassigned section to the floormap. A result of this action is shown in FIG. 8I, in which the device Vector is now assigned to the floor Ground of the building Recreation. Further, the information on the left of the screen is updated to reflect this change. In an embodiment, the user may assign devices that are disposed on one floor to be placed on another floor. For example, as shown in FIG. 8J, the user drags-and-drops the device Mach I to the unassigned menu on the left side of the screen. Next, he changes the floormap to the floor Management of the building Main Office. Then, he drags-and-drops the device Mach I to a location in the floormap corresponding to the floor Management as shown in FIG. 8K.

Afterwards, the user is presented with the option to revise the device list (e.g., device list shown in FIG. 8E) again in the case that he wishes to make more changes as indicated by the "Revise List" button (S708). In the case that he wishes to revise the device list again (S709, yes), the process repeats. Otherwise (S709, no), the device management application generates the proposed state analysis (S710), as shown in FIG. 8L.

Figure 9:
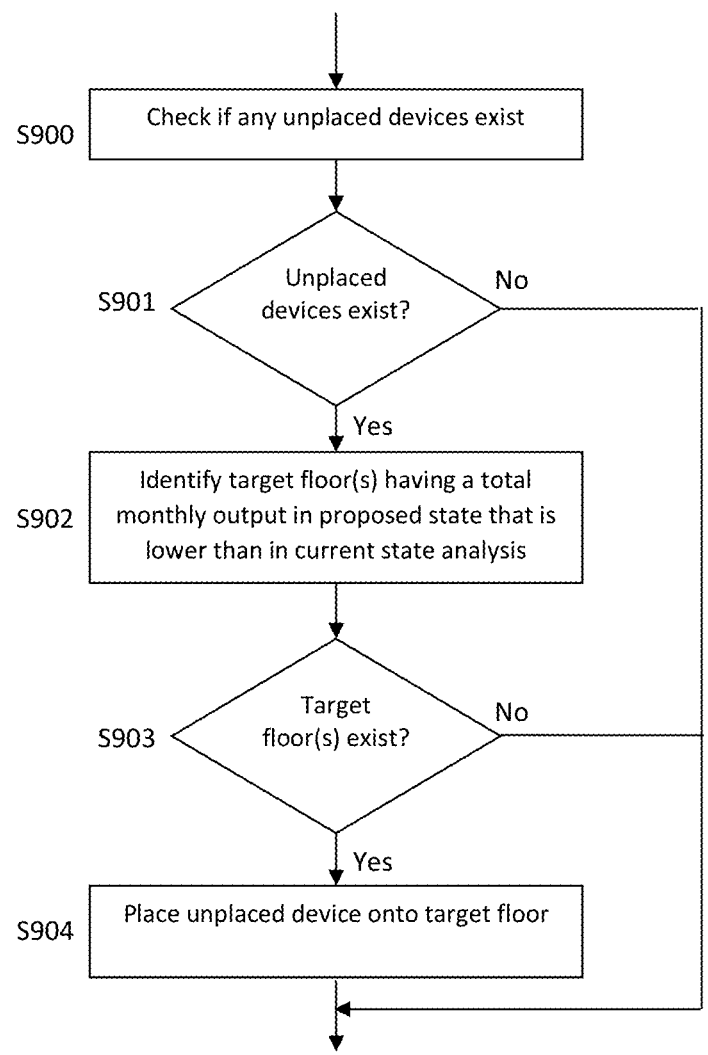
FIG. 9 shows a flow chart of a method, according to an embodiment, which can be performed in any of the systems of FIGS. 1A and 1B.

FIG. 9 shows a method that can be performed by or with a device management application (e.g., 101a) on a terminal apparatus (e.g., 101), according to an embodiment.

In an embodiment, after the proposed state floormap has been modified according to the revisions made in the device list by the user, the device management application may check if any unplaced devices exist (S900). In other words, the device management application determines if there are any devices that have not yet been placed on any floormap corresponding to the proposed state. If there are unplaced devices (S901, yes), the device management application identifies one or more target floors having a total monthly output in a proposed state that is lower than in a current state analysis (S902). In the case that there are target floors which have a total monthly output in a proposed state that is lower than in a current state analysis (S903, yes), the device management application places the unplaced device into the target floor (S904). Otherwise, if there are not unplaced devices (S901, no) and no target floors (S903, no), the process ends.

In an embodiment, when determining which of the target floors have a total monthly output in the proposed state is lower than that in the current state analysis, the device management application also identifies whether there is a gap between the total monthly output in the proposed state and that in the current state analysis. In the case that there is a gap, the device management application determines an unplaced device (if any) that has a gap that is the same as (or similar to) a monthly volume of the unplaced device.

In another embodiment, once the gap is determined, the device management application determines additionally (i) whether there are more than one unplaced devices and (ii) whether the gap of any target floor is the same as (or greater than) the sum of output volumes of the two or more unplaced devices. In the case that this is true, the device management application places the two or more unplaced devices onto the target floor.

An example including many of the aforementioned aspects, features and advantages will now be discussed.

In such example, a device management application provides a Floor Map functionality to permit a user to create a floormap for a customer site. Such provision allows the user to manage devices in the customer's fleet according to physical location, and also it makes it easy to know the places where the devices are actually installed. The Floor Map functionality may be applied to a current state analysis, as well as when planning a proposed state. The user can place the devices for a proposed state and can use it to show where the devices will be located in the proposed state.

The floormap for a customer site (e.g., for a current state analysis) may be created according to the following process. The user registers devices to the customer site and registers buildings and floors to the site. Further, the user uploads floor map image file for each floor to the system, and places device icons onto the floor map images. The system shows the created floormap on the application user interface (UI) and calculates and/or shows monthly volume, cost and $CO_2$ emission projection for each floor/building. Further, the floormap information may be generated in a report.

Further, the application can generate a proposed state floormap semi-automatically based on the current state floormap and registered devices information in the proposed state analysis. For example, a proposed state analysis is commenced by using a copy of the current state analysis data, permitting the user to modify such data, such as by replacing existing devices with new devices, modifying existing devices, removing existing devices, adding new devices, etc.

At any time, during the proposed state generation process, the application user interface may permit the user to select floormap creation. The system may create the proposed state floormap for each floor by applying the following process.

The system makes a copy of the floormap data (e.g., floormap image and device icons) for the floor in the current state analysis, as a starting point for proposed state floormap, in the proposed state analysis. The system can proceed to modify device icons on the proposed state floormap by checking existing devices from the current state of the floor, keeping the device icons (and corresponding positions) on the proposed state floormap as they are, checking for removed devices (i.e. removed from the floor) and removing the device icons from the proposed state floormap, checking for replaced devices on the floor and removing the old device icons and placing new device icons on the proposed state floormap, and checking for newly added devices in the floor (e.g., devices newly added in the proposed state and associated with the floor) and place the newly added device icons on an unplaced items portion of the proposed State floormap UI (but not on the floormap itself) and the user is permitted to move the icon from the unplaced items portion to the floormap, by manual operation.

In addition, the system checks whether any devices exist which are not placed on any floor and in this case, the system calculates Total Monthly Volume for each floor both for the current state and the proposed state. If there are no floors in the proposed state that have a lower volume than the current state, the newly added devices are not placed on any proposed state floormap, and in this case, the user needs to place the device icon by manual operation later. If there are floors in the proposed state that have lower volume (i.e. there is a gap) than the current state, the system checks the monthly volume of the newly added devices and picks a newly added device which has same or similar monthly volume as the gap. Remaining device icons are left in the unplaced items portion of the proposed state floormap UI (and the user needs to arrange such remaining device icon by manual placement later). If there is a big gap in a floor between the proposed state and the current state, the system could place devices icons of two or more remaining devices, based on fitting the monthly volumes of such devices in the gap.

The aforementioned specific embodiments are illustrative, and many variations can be introduced on these embodiments without departing from the spirit of the disclosure or from the scope of the appended claims. In addition, elements and/or features of different examples and illustrative embodiments may be combined with each other and/or substituted for each other within the scope of this disclosure and appended claims.

For example, the orders in which the steps are performed in the aforementioned methods are not limited to those shown in the examples of FIGS. 5, 7 and 9, and may be switched as long as similar results are achieved. Also, the methods illustrated in the examples of FIGS. 5, 7 and 9 may be implemented using any of the systems described in connection with FIGS. 1A and 1B.

What is claimed is:

1. A device management application configured to generate a proposed state analysis for an enterprise or enterprise site and based on a current state analysis to which are registered (i) buildings and floors of an office facility of the enterprise or enterprise site, (ii) devices in a current fleet of the enterprise or enterprise site, and (iii) locations of the devices in the office facility, the device management application including one or more programs of instructions embodied in a non-transitory computer readable medium and executable by a computer to configure the computer to perform a method comprising:

(a) providing an application user interface (UI) to or on a user terminal to permit entry and modification of a proposed state including a proposed fleet of output devices, and to provide a current state floormap, on request and based on the current state analysis, the current state floormap being generated based on floormap data registered in, or in association with, the current state analysis, and the floormap data including a floormap image of a floor in the office facility of the enterprise or enterprise site, and one or more device icons to be superposed at respective positions on the floormap image;

(b) generating a proposed state floormap, for a specified proposed state, including retrieving a copy of the floormap data of the current state floormap and using the retrieved copy of the floormap data as a starting point for generating the proposed state floormap, determining device changes as between the proposed state and the current state analysis, and conforming the proposed state floormap according to the device changes as determined;

(c) determining, after a proposed state floormap for each floor amongst the floors of the office facility is generated, whether any devices in the proposed state are unplaced, and if there is an unplaced device that is not placed on any of the floors, determining whether any floor amongst the floors of the office facility has a total monthly output in the proposed state that is lower than that in the current state analysis, and if there are target floors for which the total monthly output in the proposed state is lower than that in the current state analysis, placing by the device management application, the unplaced device on one of the target floors which is determined by the device management application.

2. The device management application as claimed in claim 1, further comprising:
   determining, by the device management application in response to user selection, via the application user interface, of a target device in the current fleet, a replacement device to replace the target device, and proposing via the application user interface the replacement device as a candidate device to replace the target device; and
   modifying the proposed state floormap, by replacing a device icon of the target device, at a corresponding position on the floormap image, with a device icon of the replacement device, and providing, on the application user interface (UI), the modified proposed state floormap including the device icon of the replacement device replacing the device icon of the target device, at the corresponding position on the floormap image.

3. The device management application as claimed in claim 1, wherein
   the proposed state is initially a copy of the current state analysis, and the method performed by the computer further comprises:
   providing the application user interface (UI) to permit the user to remove a selected device from the proposed state; and
   omitting, when modifying the proposed state floormap, a device icon of the removed device from the proposed state floormap.

4. The device management application as claimed in claim 1, further comprising:
   (d1) providing the proposed state floormap generated in (b), through the application user interface (UI) to or on the user terminal, and permitting user selection via the proposed state floormap provided through the application user interface (UI) of a target device represented in the proposed state floormap, to be replaced by a specified replacement device; and
   (d2) modifying, in response to the user selection of the target device in (d1), the proposed state floormap, by replacing a device icon of the target device, at a corresponding position on the floormap image, with a device icon of the replacement device, and providing, on the application user interface (UI), the modified proposed state floormap including the device icon of the replacement device replacing the device icon of the target device, at the corresponding position on the floormap image.

5. The device management application as claimed in claim 1, wherein
   the proposed state is initially a copy of the current state analysis, and the method performed by the computer further comprises:
   providing the application user interface (UI) to permit the user to add a new device to the proposed state; and
   maintaining, when generating the proposed state floormap, a device icon of the new device in an unplaced device portion of the proposed state floormap.

6. The device management application as claimed in claim 5, wherein the method performed by the computer further comprises:
   providing the application user interface (UI) to permit the user to move the device icon of the new device from the unplaced device portion of the proposed state floormap to any floor amongst the floors of the office facility.

7. The device management application as claimed in claim 1, wherein the method performed by the computer further comprises:
   providing the application user interface (UI) to permit the user to move a device icon of a device selected from any floor amongst the floors of the office facility, to an unplaced device portion of the proposed state floormap, and updating, in the proposed state, location information of the moved device as unplaced.

8. The device management application as claimed in claim 1, wherein the method performed by the computer further comprises:
   providing the application user interface (UI) to permit the user to make fleet changes to the proposed state, including replace a selected device in the proposed state with a new device, modify a specified device in the proposed state, remove one or more selected devices, and add new devices;
   maintaining, by the application user interface (UI), a fleet change log of the fleet changes; and
   determining the device changes as between the proposed state and the current state analysis, by referring to the fleet change log.

9. The device management application as claimed in claim 1, wherein the method performed by the computer further comprises:
   comparing the proposed state and the current state analysis to determine device changes as between the proposed state and the current state analysis.

10. The device management application as claimed in claim 1, wherein the method performed by the computer further comprises:
    determining for each of the target floors, upon determining said target floors for which the total monthly output in the proposed state is lower than that in the current state analysis, a gap between the total monthly output in the proposed state and that in the current state analysis, and placing the unplaced device on a target floor having a gap same as, or most similar to, a monthly volume of the unplaced device.

11. The device management application as claimed in claim 1, wherein the method performed by the computer further comprises:
    determining for each of the target floors, upon determining said target floors for which the total monthly output in the proposed state is lower than that in the current state analysis, a gap between the total monthly output in the proposed state and that in the current state analysis; and
    determining whether there are multiple unplaced items and whether the gap of any target floor amongst the target floors is the same as or greater than the sum of output volumes of the multiple unplaced devices, and if there are multiple unplaced items and the gap of the target floor is the same as or greater than the sum of output volumes of the multiple unplaced devices, placing the multiple unplaced items on the target floor.

12. A method performed by a device management application configured to generate a proposed state analysis for an enterprise or enterprise site and based on a current state analysis to which are registered (i) buildings and floors of an office facility of the enterprise or enterprise site, (ii) devices in a current fleet of the enterprise or enterprise site, and (iii) locations of the devices in the office facility, the device management application including one or more programs of instructions embodied in a non-transitory computer readable medium and executed by a computer, the method comprising:

(a) providing an application user interface (UI) to or on a user terminal to permit entry and modification of a proposed state including a proposed fleet of output devices, and to provide a current state floormap, on request and based on the current state analysis, the current state floormap being generated based on floormap data registered in, or in association with, the current state analysis, and the floormap data including a floormap image of a floor in the office facility of the enterprise or enterprise site, and one or more device icons to be superposed at respective positions on the floormap image;

(b) generating a proposed state floormap, for a specified proposed state, including retrieving a copy of the floormap data of the current state floormap, using the retrieved copy of the floormap data as a starting point for generating the proposed state floormap, determining device changes as between the proposed state and the current state analysis, and conforming the proposed state floormap according to the device changes as determined;

(c) determining, after a proposed state floormap is generated for each floor amongst the floors of the office facility, whether any devices in the proposed state are unplaced, and if there is an unplaced device that is not placed on any of the floors, determining whether any floor amongst the floors of the office facility has a total monthly output in the proposed state that is lower than that in the current state analysis, and if there are target floors for which the total monthly output in the proposed state is lower than that in the current state analysis, placing by the device management application, the unplaced device on one of the target floors which is determined by the device management application.

13. The method performed by the device management application and as claimed in claim 12, further comprising:
providing an unplaced device portion in the proposed state floormap;
permitting user operation of the application user interface (UI) to move a device icon of a device selected from any floor amongst the floors of the office facility, to the unplaced device portion of the proposed state floormap; and
updating, in the proposed state, location information of the moved device as unplaced.

14. The method performed by the device management application and as claimed in claim 12, further comprising:
providing an unplaced device portion in the proposed state floormap;
permitting user operation of the application user interface (UI) to move a device icon of a corresponding device from the unplaced device portion of the proposed state floormap to any floor amongst the floors of the office facility; and
updating, in the proposed state, location information of the moved device to a location on the floor to which the device is moved.

15. The method performed by the device management application and as claimed in claim 12, further comprising:
permitting user operation of the application user interface (UI) to make fleet changes to the proposed state, including replace a selected device in the proposed state with a new device, modify a specified device in the proposed state, remove one or more selected devices, and add new devices; and
maintaining a fleet change log of the fleet changes, wherein
the device changes as between the proposed state and the current state analysis are determined by referring to the fleet change log.

16. The method performed by the device management application and as claimed in claim 12, further comprising:
determining for each of the target floors for which the total monthly output in the proposed state is lower than that in the current state analysis, a gap between the total monthly output in the proposed state and that in the current state analysis; and
placing the unplaced device on a target floor having a gap same as, or most similar to, a monthly volume of the unplaced device.

17. The method performed by the device management application and as claimed in claim 12, further comprising:
determining for each of the target floors for which the total monthly output in the proposed state is lower than that in the current state analysis, a gap between the total monthly output in the proposed state and that in the current state analysis;
determining whether there are multiple unplaced items and whether the gap of any target floor amongst the target floors is the same as or greater than the sum of output volumes of the multiple unplaced devices, and if there are multiple unplaced items and the gap of the target floor is the same as or greater than the sum of output volumes of the multiple unplaced devices, placing the multiple unplaced items on the target floor.

18. The method performed by the device management application and as claimed in claim 12, further comprising:
(e1) determining, by the device management application in response to user selection, via the application user interface, of a target device in the current fleet, a replacement device to replace the target device, and proposing via the application user interface the replacement device as a candidate device to replace the target device; and
modifying the proposed state floormap, by replacing a device icon of the target device, at a corresponding position on the floormap image, with a device icon of the replacement device, and providing, on the application user interface (UI), the modified proposed state floormap including the device icon of the replacement device replacing the device icon of the target device, at the corresponding position on the floormap image.

* * * * *